(12) United States Patent
Seregin et al.

(10) Patent No.: US 10,291,940 B2
(45) Date of Patent: May 14, 2019

(54) CODING RUNS WITH ESCAPE IN PALETTE-BASED VIDEO CODING

(71) Applicant: QUALCOMM Incorporated, San Diego, CA (US)

(72) Inventors: Vadim Seregin, San Diego, CA (US); Rajan Laxman Joshi, San Diego, CA (US); Marta Karczewicz, San Diego, CA (US); Wei Pu, San Diego, CA (US); Joel Sole Rojals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/719,265

(22) Filed: May 21, 2015

(65) Prior Publication Data
US 2015/0341674 A1     Nov. 26, 2015

Related U.S. Application Data

(60) Provisional application No. 62/065,526, filed on Oct. 17, 2014, provisional application No. 62/059,659, (Continued)

(51) Int. Cl.
*H04N 19/93*     (2014.01)
*H04N 19/186*     (2014.01)
(Continued)

(52) U.S. Cl.
CPC ........... *H04N 19/93* (2014.11); *H04N 19/105* (2014.11); *H04N 19/157* (2014.11);
(Continued)

(58) Field of Classification Search
CPC .... H04N 19/597; H04N 19/105; H04N 19/93; H04N 19/186
(Continued)

(56) References Cited

U.S. PATENT DOCUMENTS

2010/0034260 A1*   2/2010   Shimizu ............... H04N 19/597
                                                                375/240.12
2012/0307888 A1    12/2012   Guo et al.
(Continued)

FOREIGN PATENT DOCUMENTS

CN           1625893 A      6/2005
CN       101317197 A     12/2008
(Continued)

OTHER PUBLICATIONS

Sun, "AHG10: A triplet palette mode combining JCTVC-P0108 and JCTVC-P0198", Mar. 27, 2017, JCTVC (Year: 2014).*
(Continued)

*Primary Examiner* — Albert Kir
(74) *Attorney, Agent, or Firm* — Shumaker & Sieffert, P.A.

(57) ABSTRACT

In an example a method of processing video data includes determining palette indices of a first row of a block of video data, wherein the palette indices correspond to a palette of one or more colors for coding the block of video data, and wherein the palette indices of the first row include one or more indices that are associated with a color value in the palette and a syntax element that is not associated with a color value in the palette. The method also includes coding a run of palette indices of a second row of the block of video data relative to the palette indices of the first row, wherein the run includes the one or more indices that are associated with a color value in the palette and the syntax element that is not associated with a color value in the palette.

20 Claims, 10 Drawing Sheets

US 10,291,940 B2

Page 2

Related U.S. Application Data filed on Oct. 3, 2014, provisional application No. 62/019,223, filed on Jun. 30, 2014, provisional application No. 62/015,261, filed on Jun. 20, 2014, provisional application No. 62/009,772, filed on Jun. 9, 2014, provisional application No. 62/002,717, filed on May 23, 2014.

(51) Int. Cl.
| | |
| --- | --- |
| *H04N 19/105* | (2014.01) |
| *H04N 19/176* | (2014.01) |
| *H04N 19/70* | (2014.01) |
| *H04N 19/157* | (2014.01) |
| *H04N 19/597* | (2014.01) |

(52) U.S. Cl.
CPC ......... *H04N 19/176* (2014.11); *H04N 19/186* (2014.11); *H04N 19/70* (2014.11)

(58) Field of Classification Search
USPC .................................................. 375/240.12
See application file for complete search history.

(56) References Cited

U.S. PATENT DOCUMENTS

| | | | |
| --- | --- | --- | --- |
| 2013/0114676 A1 | 5/2013 | Guo et al. | |
| 2013/0195182 A1 | 8/2013 | Kung et al. | |
| 2015/0010053 A1* | 1/2015 | Xu ....................... | H04N 19/105 375/240.02 |
| 2015/0341635 A1 | 11/2015 | Seregin et al. | |
| 2015/0341656 A1 | 11/2015 | Seregin et al. | |
| 2015/0341660 A1 | 11/2015 | Joshi | |
| 2016/0323591 A1 | 11/2016 | Chuang et al. | |

FOREIGN PATENT DOCUMENTS

| | | |
| --- | --- | --- |
| CN | 101563930 A | 10/2009 |
| CN | 102257495 A | 11/2011 |

OTHER PUBLICATIONS

International Preliminary Report on Patentability from Application Serial No. PCT/US2015/032286 dated Jun. 16, 2016 (9 pages).
Reply to Second Written Opinion from Application Serial No. PCT/US2015/032262 filed on Aug. 5, 2016 (19 pages).
International Preliminary Report on Patentability from International Application No. PCT/US2015/032262, dated Sep. 23, 2016, 8 pp.
International Preliminary Report on Patentability from International Application No. PCT/US2015/032282, dated Dec. 8, 2016, 9 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and TU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "Description of Screen Content Coding Technology Proposal by Qualcomm", JCT-VC Meeting, Valencia, (Joint Collaborative Team on Video Coding of ISO/IEC JTC1/SC29/WG11 and ITU-T SG.16), Mar. 27-Apr. 4, 2014; No. JCTVC-Q0031-v3, Mar. 28, 2014, XP030115916, 19 pp.
Guo, et al.,"RCE4: Results of Test 2 on Palette Mode for Screen Content Coding", JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-P0198-v3, Jan. 8, 2014, XP030115731, 3 pp.
Hsiang, et al., "CE6: Results of Test A.4 on Palette Run Coding", JCT-VC Meeting; Oct. 17-24, 2014; Strasbourg; (Joint Collaborative Team on Video Coding of ISO/IEC JTC1/SC29/WG11 and ITU-T SG.6); URL: http://wftp3.itu.int/av-arch/jctvc-site/, No. JCTVC-S0163, Oct. 8, 2014, XP030116937, 7 pp.
Hsiang, et al., "CE6-Related: Harmonization of CE6 Tests A4, A5, and A6", JCT-VC Meeting; Oct. 17-24, 2014; Strasbourg; (Joint Collaborative Team on Video Coding of ISO/IEC JTC1/SC29/WG11 and ITU-T SG.16); URL: http:wftp3.itu.int/av-arch/jctvc-site/ No. JCTVC-S0269-v3, Oct. 22, 2014 , KP030117066, 8 pp.
Jin, et al., "Non-RCE4: Palette prediction for palette coding", JCT-VC Meeting; Sep. 1, 2014-Jan. 17, 2014; San Jose; (Joint Collaborative Team on Video Coding of ISO/IEC JTC1/SC29/WG11 and ITU-T SG.16 ); URL: http://wftp3.itu.int/av-arch/jctvc-site/ No. JCTVC-P0160, Jan. 4, 2014 (Jan. 4, 2014), XP030115679.
Joshi, et al., "CE6 Subtest A5: Contexts for Run Coding in Palette Mode", JCT-VC Meeting; Jan. 9-17, 2014; Strasbourg; (Joint Collaborative Team on Video Coding of ISO/IEC JTC1/SC29/WG11 and ITU-T SG.6); URL: http://wftp3.itu.int/av-arch/jctvc-site/, No. JCTVC-S0038, Oct. 8, 2014, pp. 1-7, XP030116764, 7 pp.
Joshi, et al., "Non-SCCE3: Contexts for Coding Index Runs", JCT-VC Meeting; Jun. 30-Jul. 9, 2014; SAPPORO; (Joint Collaborative Team on Video Coding of ISO/IEC JTC1/SC29/WG11 and ITU-T SG.16); URL: http://wftp3.itu.int/av-arch/jctvc-site/, No. JCTVC-R0174, Jun. 21, 2014; XP030116459, 3 pp.

(56) References Cited

OTHER PUBLICATIONS

Laroche, et al., "Non-RCE4: Palette Prediction for Palette mode", JCT-VC Meeting; Jan. 9-17, 2014; San Jose; (Joint Collaborative Team on Video Coding of ISO/IEC JTC1/SC29/WG11 and ITU-TSG.16); URL: http:/wftp3.itu.int/av-arch/jctvc-site/, No. JCTVC-P0114-v3, 6 pp.
Laroche, et al., "Non-RCE4: Run Coding for Palette Mode", JCT-VC Meeting; Jan. 9-17, 2014; San Jose; (Joint Collaborative Team on Video Coding of ISO/IEC JTC1/SC29WG11 and ITU-T SG.16); URL: http://wftp3.itu.int/av-arch/jctvc-site/ No. JCTVC-P0113-v5, Jan. 10, 2014, XP030115609, 8 pp.
Misra, et al., "Using the wavefront store-and-sync design for palette table prediction variables", JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/ No. JCTVC-S0141-v4, Oct. 15, 2014, XP030116909, 6 pp.
Seregin, et al., "Non-CE6: Copy mode and escape coded sample", JCT-VC Meeting; Oct. 17-24, 2014; Strabourg; (Joint Collaborative Team on Video Coding of ISO/IEC JTC, 1/SC29/WG11 and ITU-T SG.16 ); URL: http://wftp3.itu.int/av-arch/jctvc-site/ ,No. JCTVC-80157, Oct. 8, 2014, XP030116929, 3 pages.
Seregin, et al., "Non-SCCE3: Palette predictor resetting", JCT-VC Meeting; Jun. 30-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R0229-v3, Jul. 1, 2014, XP030116531, 4 pages.
Sun, et al., "AHG10: A Triplet Palette Mode Combining JCTVC-P0108 and JCTVC-P0198", JCT-VC Meeting; Mar. 27-Apr. 4, 2014; Valencia; (Joint Collaborative Team on Video Coding of ISO/IEC JTC1/SC29WG11 and ITU-T SG.16 ); URL: http://wftp3.itu.int/av-arch/jctvc-site/ No. JCTVC-Q0083-v3, Mar. 27, 2014, XP030115988, 9 pp.
Xiu, et aL, "Description of Screen Content Coding Technology Proposal by Inter Digital", JCT-VC Meeting; Mar. 27-Apr. 4, 2014; Valencia; (Joint Collaborative Team on Video Coding of ISO/IEC JTC1/SC29/WG11 and ITU-T SG.16); URL: http:/wftp3.itu.int/av-arch/jctvc-site/, No. JCTVC-Q0037, Mar. 18, 2014 , 30 pp., XP030115927.
Xiu, et aL, "Non-CE6: Removal of parsing dependency in palette-based coding", JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/ No. JCTVC-S0181-r1, Oct. 17, 2014, 9 pp.; XP030116964.
Xiu, et aL, "Non-CE6: Unification of coding of escape indices and other palette indices", JCT-VC Meeting; Oct. 17-24, 2014; Strasbourg: (Joint Collaborative Team on Video Coding of ISO/IEC JTC1/SC29/WG11 and ITU-T SG.16 ); URL: http://wftp3.itu.int/av-arch/jctvc-site/, No. JCTVC-S0258, Oct. 14, 2014, XP030117052, 7 pp.
Zhu, et al., "AHG10: Modified copy above mode for palette based coding", JCT-VC Meeting; Mar. 27-Apr. 4, 2014; Valencia; (Joint Collaborative Team on Video Coding of ISO/IEC JTC1/SC29/WG11 and ITU-T SG.16 ); URL: http://wftp3.itu.int/av-arch/jcivc-site/ , No. JCTVC-Q0174-v2, Mar. 29, 2014, XP030116122, 3 pp.
Zou, et al., "Non-RCE4: Joint proposal of JCTVC-P0231 and JCTVC-P0119: Palette with limit run and palette predictor", JCT-VC Meeting; Jan. 9-17, 2014; San Jose; (Joint Collaborative Team on Video Coding of ISO/IEC JTC1/SC291WG11 and ITU-T SG.16 ); URL: http://wftp3.itu.int/av-arch/jctvc-site/ No. JCTVC-P0239, Jan. 11, 2014, XP030115784.
Laroche, et al., "AhG10: Run coding for palette mode," JCT-VC Meeting; Mar. 27-Apr. 4, 2014; (Joint Collaborative Team on Video Coding of ISO/IEC JTC1/SC29/WG11 and ITU-T SG.16 ); No. JCTVC-D0066, Mar. 17, 2014, 7 pp.
Pu, et al., "AHG10: Suggested Software for Palette Coding based on RExt6.0," JCT-VC Meeting; Mar. 27-Apr. 4, 2014; (Joint Collaborative Team on Video Coding of ISO/IEC JTC1/SC29/WG11 and ITU-T SG.16 ); No. JCTVC-Q0094, Mar. 19, 2014, 4 pages.
Zhu, et al., "AHG10: Modified copy above mode for palette based coding," JCT-VC Meeting; Mar. 27-Apr. 4, 2014; (Joint Collaborative Team on Video Coding of ISO/IEC JTC1/SC29/WG11 and ITU-T SG.16 ); No. JCTVC-Q0174, Mar. 19, 2014, 3 pages.
Huang, et al., "Description of Screen Content Core Experiment 3 (SCCE3): Palette mode," JCT-VC Meeting; Mar. 27-Apr. 4, 2014; (Joint Collaborative Team on Video Coding of ISO/IEC JTC1/SC29/WG11 and ITU-T SG.16 ); No. JCTVC-Q1123, Apr. 18, 2014, 11 pp.
Pu, et al., "SCCE3: Test B.12—Binarization of Exacpe Sample and Palette Index," JCT-VC Meeting; Jun. 30-Jul. 9, 2014; (Joint Collaborative Team on Video Coding of ISO/IEC JTC1/SC29/WG11 and ITU-T SG.16 ); No. JCTVC-R0065, Jun. 21, 2014; 3 pp.
Sun, et al., "CE6 Test C.2: Transition copy mode," JCT-VC Meeting; Oct. 17-24, 2014; (Joint Collaborative Team on Video Coding of ISO/IEC JTC1/SC29/WG11 and ITU-T SG.16 ); No. JCTVC-S0078, Oct. 8, 2014, 6 pp.
Joshi, et al., "High Efficiency Video Coding (HEVC) Screen Content Coding: Draft 3," JCT-VC Meeting; Feb. 10-17, 2015; (Joint Collaborative Team on Video Coding of ISO/IEC JTC1/SC29/WG11 and ITU-T SG.16 ); No. JCTVC-T1005_v2, Apr. 5, 2015, 567 pp.
International Search Report and Written Opinion from International Application No. PCT/US2015/032282, dated Sep. 8, 2015, 13 pp.
International Search Report and Written Opinion from International Application No. PCT/US2015/032286, dated Oct. 1, 2015, 13 pp.
Response to Written Opinion dated Oct. 1, 2015, from International Application No. PCT/US2015/032286, filed on Mar. 22, 2016, 17 pp.
International Search Report and Written Opinion from International Application No. PCT/US2015/032262, dated Sep. 23, 2015, 15 pp.
Response to Written Opinion dated Sep. 23, 2015, from International Application No. PCT/US2015/032262, filed on Mar. 22, 2016, 20 pp.
Second Written Opinion from International Application No. PCT/US2015/032262, dated Jun. 8, 2016, 10 pp.
Jin, et al., "Non-RCE4: Palette prediction for palette coding", JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-P0160, Jan. 4, 2014, XP030115679, 15 pp.
Bugdayci D., et al., "AHG10: Improvements on Palette Coding", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, JCTVC-Q0071, Jan. 22, 2017, 8 pp.
Final Office Action from U.S. Appl. No. 14/719,260 dated Jul. 14, 2017 (19 pages).
Amendment in response to Final Office Action dated Jul. 15, 2018 from U.S. Appl. No. 14/719,260, filed Sep. 13, 2017 (16 pages).
Advisory Action including Interview Summary from U.S. Appl. No. 14/719,260 dated Oct. 6, 2017 (7 pages).
Final Office Action from U.S. Appl. No. 14/719,263 dated Jul. 14, 2017 (22 pages).
Amendment in response to Final Office Action dated Jul. 14, 2017 from U.S. Appl. No. 14/719,263 filed Sep. 13, 2017 (16 pages).
Advisory Action including Interview summary from U.S. Appl. No. 14/719,263 dated Oct. 4, 2017 (5 pages).
Response to Office Action dated Dec. 29, 2017 from U.S. Appl. No. 14/719,263, filed Mar. 29, 2018, 16 pp.
Response to Office Action dated Jan. 4, 2018 from U.S. Appl. No. 14/719,260, filed Apr. 3, 2018, 12 pp.
Office Action from U.S. Appl. No. 14/719,263, dated Dec. 29, 2017, 24 pp.
Office Action from U.S. Appl. No. 14/719,260, dated Jan. 4, 2018, 17 pp.

* cited by examiner

FIG. 5

| 222C | 24 | 28 | 32 | 50 | 54 | 72 | 76 | |
|---|---|---|---|---|---|---|---|---|
| | 23 | 27 | 31 | 49 | 53 | 71 | 75 | |
| | 22 | 26 | 30 | 48 | 52 | 70 | 74 | 222I |
| | 21 | 25 | 29 | 47 | 51 | 69 | 73 | |
| 222B | 14 | 17 | 20 | 43 | 46 | 65 | 68 | |
| | 13 | 16 | 19 | 42 | 45 (222E) | 64 | 67 | 222H |
| | 12 | 15 | 18 | 41 | 44 | 63 | 66 | |
| 222A | 3 | 7 | 11 | 36 | 40 | 58 | 62 | |
| | 2 | 6 | 10 | 35 | 39 | 57 | 61 | 222G |
| | 1 | 5 | 9 | 34 | 38 | 56 | 60 | |
| | 0 | 4 | 8 | 33 | 37 | 55 | 59 | |

220, 222D (bottom), 222F (top)

CODING RUNS WITH ESCAPE IN PALETTE-BASED VIDEO CODING

This application claims the benefit of U.S. Provisional Application No. 62/002,717, filed May 23, 2014, U.S. Provisional Application No. 62/009,772, filed Jun. 9, 2014. U.S. Provisional Application No. 62/015,261, filed Jun. 20, 2014, U.S. Provisional Application No. 62/019,223, filed Jun. 30, 2014, U.S. Provisional Application No. 62/059,659, filed Oct. 3, 2014, and U.S. Provisional Application No. 62/065,526, filed Oct. 17, 2014, the entire contents each of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

Techniques of this disclosure relate to palette-based video coding. For example, in palette based coding, a video coder (a video encoder or video decoder) may form a "palette" as a table of colors for representing the video data of the particular area (e.g., a given block). Palette-based coding may be especially useful for coding areas of video data having a relatively small number of colors. Rather than coding actual pixel values (or their residuals), the video coder may code index values for one or more of the pixels that relate the pixels with entries in the palette representing the colors of the pixels. The techniques described in this disclosure may include techniques for various combinations of one or more of predicting palette entries, coding runs of palette indices, and various other palette coding techniques.

In an example, a method of processing video data includes determining a first palette for a first block of video data that is located in a first row of blocks, wherein the first palette comprises one or more palette entries each including a palette index that is associated with a color value for coding the block of video data, generating a predictor palette for constructing at least one second palette of at least one second block of video data in the first row of blocks coded after the first block, wherein the predictor palette includes at least one palette entry from one or more blocks of the first row other than the first block, reinitializing the predictor palette for determining a third palette of a third block of video data that is located in a second row of blocks, wherein re-initializing the predictor palette comprises re-initializing the predictor palette based on the one or more palette entries of the first palette or an initial predictor palette generated after coding the first block, determining the third palette of the third block based on the re-initialized predictor palette, and coding the third block using the third palette.

In another example, a device for processing video data includes a memory configured to store a first block of video data, at least one second block of video data and a third block of video data, and one or more processors configured to determine a first palette for the first block of video data that is located in a first row of blocks, wherein the first palette comprises one or more palette entries each including a palette index that is associated with a color value for coding the block of video data, generate a predictor palette for constructing at least one second palette of the at least one second block of video data in the first row of blocks coded after the first block, wherein the predictor palette includes at least one palette entry from one or more blocks of the first row other than the first block, reinitialize the predictor palette for determining a third palette of the third block of video data that is located in a second row of blocks, wherein re-initializing the predictor palette comprises re-initializing the predictor palette based on the one or more palette entries of the first palette or an initial predictor palette generated after coding the first block, determine the third palette of the third block based on the re-initialized predictor palette, and code the third block using the third palette.

In another example, an apparatus for processing video data includes means for determining a first palette for a first block of video data that is located in a first row of blocks, wherein the first palette comprises one or more palette entries each including a palette index that is associated with a color value for coding the block of video data, means for generating a predictor palette for constructing at least one second palette of at least one second block of video data in the first row of blocks coded after the first block, wherein the predictor palette includes at least one palette entry from one or more blocks of the first row other than the first block, means for reinitializing the predictor palette for determining a third palette of a third block of video data that is located in a second row of blocks, wherein re-initializing the predictor palette comprises re-initializing the predictor palette based on the one or more palette entries of the first palette or an initial predictor palette generated after coding the first block or an initial predictor palette generated after coding the first block, means for determining the third palette of the third block based on the re-initialized predictor palette, and means for coding the third block using the third palette.

In another example, a non-transitory computer-readable medium has instructions stored thereon that, when executed, cause one or more processors to determine a first palette for a first block of video data that is located in a first row of blocks, wherein the first palette comprises one or more palette entries each including a palette index that is associated with a color value for coding the block of video data, generate a predictor palette for constructing at least one second palette of at least one second block of video data in the first row of blocks coded after the first block, wherein the predictor palette includes at least one palette entry from one or more blocks of the first row other than the first block, reinitialize the predictor palette for determining a third palette of a third block of video data that is located in a second row of blocks, wherein re-initializing the predictor palette comprises re-initializing the predictor palette based on the one or more palette entries of the first palette or an initial predictor palette generated after coding the first block, determine the third palette of the third block based on the re-initialized predictor palette, and code the third block using the third palette.

In another example, a method of processing video data includes determining a run value that indicates a run-length of a run of a palette index of a block of video data, wherein the palette index is associated with a color value in a palette of color values for coding the block of video data, determining a context for context adaptive coding of data that represents the run value based on the palette index, and coding the data that represents run value from a bitstream using the determined context.

In another example, a device for processing video data includes a memory configured to store a block of video data, and one or more processors configured to determine a run value that indicates a run-length of a run of a palette index of the block of video data, wherein the palette index is associated with a color value in a palette of color values for coding the block of video data, determine a context for context adaptive coding of data that represents the run value based on the palette index, and code the data that represents run value from a bitstream using the determined context.

In another example, an apparatus for processing video data includes means for determining a run value that indicates a run-length of a run of a palette index of a block of video data, wherein the palette index is associated with a color value in a palette of color values for coding the block of video data, means for determining a context for context adaptive coding of data that represents the run value based on the palette index; and means for coding the data that represents run value from a bitstream using the determined context.

In another example, a non-transitory computer-readable medium has instructions stored thereon that, when executed, cause one or more processors to determine a run value that indicates a run-length of a run of a palette index of a block of video data, wherein the palette index is associated with a color value in a palette of color values for coding the block of video data, determine a context for context adaptive coding of data that represents the run value based on the palette index, and code the data that represents run value from a bitstream using the determined context.

In another example, a method of processing video data includes determining palette indices of a first row of a block of video data, wherein the palette indices correspond to a palette of one or more colors for coding the block of video data, and wherein the palette indices of the first row include one or more indices that are associated with a color value in the palette and a syntax element that is not associated with a color value in the palette, and coding a run of palette indices of a second row of the block of video data relative to the palette indices of the first row, wherein the run includes the syntax element that is not associated with a color value in the palette.

In another example, a device for processing video data includes a memory configured to store a block of video data, and one or more processors configured to determine palette indices of a first row of the block of video data, wherein the palette indices correspond to a palette of one or more colors for coding the block of video data, and wherein the palette indices of the first row include one or more indices that are associated with a color value in the palette and a syntax element that is not associated with a color value in the palette, and code a run of palette indices of a second row of the block of video data relative to the palette indices of the first row, wherein the run includes the one or more indices that are associated with a color value in the palette and the syntax element that is not associated with a color value in the palette.

In another example, An apparatus for processing video data includes means for determining palette indices of a first row of a block of video data, wherein the palette indices correspond to a palette of one or more colors for coding the block of video data, and wherein the palette indices of the first row include one or more indices that are associated with a color value in the palette and a syntax element that is not associated with a color value in the palette, and means for coding a run of palette indices of a second row of the block of video data relative to the palette indices of the first row, wherein the run includes the one or more indices that are associated with a color value in the palette and the syntax element that is not associated with a color value in the palette.

In another example, a non-transitory computer-readable medium has instructions stored thereon that, when executed, cause one or more processors to determine palette indices of a first row of a block of video data, wherein the palette indices correspond to a palette of one or more colors for coding the block of video data, and wherein the palette indices of the first row include one or more indices that are associated with a color value in the palette and a syntax element that is not associated with a color value in the palette, and code a run of palette indices of a second row of the block of video data relative to the palette indices of the first row, wherein the run includes the one or more indices that are associated with a color value in the palette and the syntax element that is not associated with a color value in the palette.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 5 is a conceptual diagram illustrating example tiles in accordance with the High Efficiency Video Coding (HEVC) standard.

DETAILED DESCRIPTION

Figure 1:
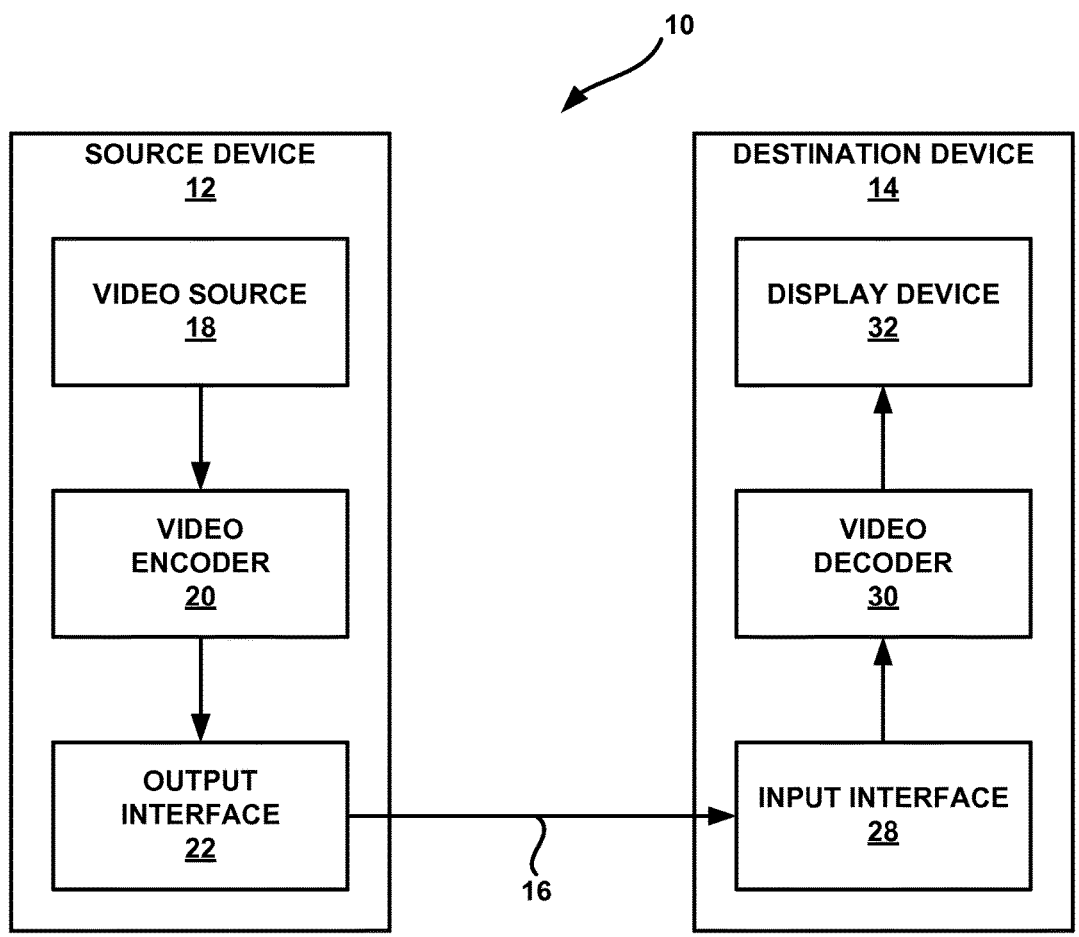
FIG. 1 is a block diagram illustrating an example video coding system that may utilize the techniques described in this disclosure.

Aspects of this disclosure are directed to techniques for video coding and video data compression. In particular, this disclosure describes techniques for palette-based coding of video data. In traditional video coding, images are assumed to be continuous-tone and spatially smooth. Based on these assumptions, various tools have been developed such as block-based transform, filtering, and other coding tools and such tools have shown good performance for natural content videos.

However, in applications like remote desktop, collaborative work and wireless display, computer generated screen content may be the dominant content to be compressed. This type of content tends to have discrete-tone, feature sharp lines, and present high contrast object boundaries. The assumption of continuous-tone and smoothness may no longer apply, and thus, traditional video coding techniques may be inefficient in compressing the content.

This disclosure describes palette-based coding, which may be particularly suitable for screen generated content coding or other content where one or more traditional coding tools are inefficient. The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard being developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003_v13, 12$^{th}$ Meeting of JCT-VC of ITU-T SG16 WP 3 and ISO/IEC JCT 1/SC 29/WG 11, 14-23 Jan. 2013 ("HEVC Draft 10").

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

In palette-based coding a particular area of video data may be assumed to have a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block, locating an entry in the palette to represent the value of each pixel, and encoding the palette with index values for the pixels relating the pixel value to the palette. A video decoder may obtain, from an encoded bitstream, a palette for a block, as well as index values for the pixels of the block. The video decoder may relate the index values of the pixels to entries of the palette to reconstruct the pixel values of the block. Pixels (and/or related index values that indicate a pixel value) may generally be referred to as samples.

It is assumed that samples in the block are processed (e.g., scanned) using horizontal raster scanning order. For example, the video encoder may convert a two-dimensional block of indices into a one-dimensional array by scanning the indices using a horizontal raster scanning order. Likewise, the video decoder may reconstruct a block of indices using the horizontal raster scanning order. Accordingly, this disclosure may refer to a previous sample as a sample that precedes the sample currently being coded in the block in the scanning order. It should be appreciated that scans other than a horizontal raster san, such as vertical raster scanning order, may also be applicable. The example above is intended provide a general description of palette-based coding.

A palette typically includes entries numbered by an index and representing at least one color component (for example, at least on one component of RGB, YUV, or the like) values or intensities. Both a video encoder and a video decoder determine the number of palette entries, color component values for each palette entry and the exact ordering of the palette entries for the current block. In this disclosure, it is assumed that each palette entry specifies the values for all color components of a sample. However, the concepts of this disclosure are applicable to using a separate palette for each color component.

In some examples, a palette may be composed using information from previously coded blocks or previously coded palettes. That is, a palette may contain predicted palette entries predicted from the palette(s) used to code the previous block(s). For example, as described in standard submission document Wei Pu et al., "AHG10: Suggested Software for Palette Coding based on RExt6.0," JCTVC-Q0094, Valencia, ES, 27 Mar.-4 Apr. 2014 (hereinafter JCTVC-Q0094), a palette may include entries that are copied from a predictor palette. A predictor palette may include palette entries from blocks previously coded using palette mode or other reconstructed samples. The predictor palette may use all or part of a previously-coded palette, or may be composed from entries of several previously-coded palettes.

In some examples, for each entry in the predictor palette, a binary flag may be coded to indicate whether the entry associated with the flag is copied to the current palette (e.g., indicated by flag=1). The string of binary flags may be referred to as the binary palette prediction vector. The palette for coding a current block may also include a number of new palette entries, which may be explicitly coded (e.g., separately from the palette prediction vector). An indication of the number of new entries may also be coded. A sum of the predicted entries and new entries may indicate the total palette size in for block.

As proposed JCTVC-Q0094, each sample in a block coded with a palette-based coding mode may be coded using one of the three palette modes, as set forth below:

Escape mode: in this mode, the sample value is not included into a palette as a palette entry and the quantized sample value is signaled explicitly for all color components. It is similar to the signaling of the new palette entries, although for new palette entries, the color component values are not quantized.

CopyFromTop mode (also referred to as CopyAbove mode): in this mode, the palette entry index for the current sample is copied from the sample located directly above in a block.

Value mode (also referred to as Index mode): in this mode, the value of the palette entry index is explicitly signaled.

As described herein, a palette entry index may be referred as a palette index or simply index. These terms can be used interchangeably to describe techniques of this disclosure. In addition, as described in greater detail below, a palette index may have one or more associated color or intensity values. For example, a palette index may have a single associated color or intensity value associated with a single color or intensity component of a pixel (e.g., an Red component of RGB data, a Y component of YUV data, or the like). In another example, a palette index may have multiple associated color or intensity values. In some instances, palette-based coding may be applied to code monochrome video. Accordingly, "color value" may generally refer to any color or non-color component used to generate a pixel value.

For CopyFromTop and Value modes, a run value (which may also be referred to simply as run) may also be signaled. A run value may indicate a number of consecutive samples (e.g., a run of samples) in a particular scan order in a palette-coded block that are coded together. In some instances, the run of samples may also be referred to as a run of palette indices, because each sample of the run has an associated index to a palette.

A run value may indicate a run of palette indices that are coded using the same palette-coding mode. For example, with respect to Value mode, a video coder (a video encoder or video decoder) may code a palette index (also referred to as a palette index value or simply index value) and a run value that indicates a number of consecutive samples in a scan order that have the same palette index and that are being coded with the palette index. With respect to Copy-FromTop mode, the video coder may code an indication that an index for the current sample value is copied based on an index of an above-neighboring sample (e.g., a sample that is positioned above the sample currently being coded in a block) and a run value that indicates a number of consecutive samples in a scan order that also copy a palette index from an above-neighboring sample and that are being coded with the palette index. Accordingly, in the examples above, a run of palette indices refers to a run of palette indices having the same value or a run of palette indices that are copied from above-neighboring palette indices.

Hence, the run may specify, for a given mode, the number of subsequent samples that belong to the same mode. In some instances, signaling an index and a run value may be similar to run length coding. In an example for purposes of illustration, a string of consecutive indices of a block may be 0, 2, 2, 2, 2, 5 (e.g., where each index corresponds to a sample in the block). In this example, a video coder may code the second sample (e.g., the first index value of two) using Value mode. After coding an index that is equal to 2, the video coder may code a run of three, which indicates that the three subsequent samples also have the same index value of two. In a similar manner, coding a run of four after coding an index using CopyFromTop mode may indicate that a total of five indices are copied from the corresponding indices in the row above the sample position currently being coded.

As described in greater detail below, a video coder (e.g., a video encoder and a video decoder) may encode or decode data that indicates whether a sample is coded as an escape sample on a per-sample basis. Escape samples (also referred to as escape pixels) may be samples (or pixels) of a block that do not have a corresponding color represented in a palette for coding the block. Accordingly, escape samples may not be reconstructed using a color entry (or pixel value) from a palette. Instead, the color values for escape samples are signaled in a bitstream separately from the color values of the palette. In general, coding a sample using "Escape mode" may generally refer coding a sample of a block that does not have a corresponding color represented in a palette for coding the block. As noted above, such samples may be referred to as escape samples or escape pixels.

In some examples, the video coder may code a flag for each sample that indicates whether the sample is coded as an escape sample (this technique may be referred to as explicit escape signaling, as described in greater detail below with respect to the example of FIG. 1). In another example, the video coder may code an additional index value for a palette to indicate that a particular sample is coded as an escape sample (this technique may be referred to as implicit escape signaling, as described in greater detail with respect to the example of FIG. 1).

The techniques described in this disclosure may include techniques for various combinations of predicting palette entries, coding runs of palette indices, and a variety of other palette coding techniques. As described in greater detail below, the techniques of this disclosure may, in some instances, improve efficiency and improve bitrate when coding video data using a palette mode.

For example, certain aspects of this disclosure are directed to techniques for predicting palette entries for a block of video data. In some instances, a predictor palette may be reset for a block at the left edge of a picture. That is, when generating a palette for the block at the left edge of the picture, the predictor palette may be reset to zero (e.g., the predictor palette has no entries and the current palette is not predicted using a predictor palette). The predictor may be reset, in this manner, because a predictor palette may include palette entries that mostly belong to palettes of blocks located at the right side of the picture after decoding a line (e.g., assuming a left to right raster scan). Accordingly, upon coding the first block of the following row (the block at the left most edge of the picture), the predictor palette may include colors of blocks that are located relatively far away from the block currently being coded. Thus, the predictor palette may not be very effective at predicting a current palette for the current block (e.g., the colors of pixels at the left side of a picture may differ from the colors of pixels at the right side of the picture).

However, in some instances, resetting a predictor palette may lead to coding losses. For example, without a predictor palette, a video coder (a video encoder 20 or video decoder) may code data that indicates all of the entries of a palette (e.g., all of the palette indices and related color values) in a bitstream. This may be a relatively large amount of data relative to data associated with predicted palette entries. Accordingly, resetting a predictor palette may adversely affect the bitrate of video data coded with palette-based coding.

According to aspects of this disclosure, a predictor palette for constructing a palette for a block of video data in a first line may be reinitialized based on one or more blocks of another line. For example, a video coder may determine a first palette for a first block of video data that is located in a first row of blocks. The video coder may also generate a predictor palette when coding one or more other blocks in the first row. Upon coding a block in a second row, the video coder may reinitialize the predictor palette for determining a palette of the block in the second row based on the entries of the first palette. According to some aspects of this disclosure, the row of blocks may be a row of blocks of a certain size (e.g., a row of coding tree units (CTUs), as described below). The row length may represent a picture width in the selected block units, and the number of rows may represent the picture height in the selected block units.

In some examples, the reinitialized predictor palette includes entries of a palette of one or more blocks that are positioned relatively close to the block currently being coded. Accordingly, the predictor palette may include entries having a higher likelihood of being included in a palette of the block currently being coded (e.g., relative to a predictor palette based on blocks located far away from the current block or a predictor palette that has been reset). In this manner, the techniques of this disclosure may increase coding efficiency, because the video coder may determine the palette for the current block using the predictor palette rather than coding the entries of the palette in the bitstream.

Other aspects of this disclosure are directed to coding (i.e., encoding or decoding) a run value that indicates a run-length of a run of palette indices. For example, as noted above, a run may specify, for an index currently being coded with a given mode, the number of subsequent samples that are coded with current index using the same mode.

In some instances, data indicating the run value may be coded using a context adaptive coding technique, such as Context Adaptive Binary Arithmetic Coding (CABAC), context adaptive variable length coding (CAVLC), or another context adaptive coding technique. For example, a video coder (a video encoder or a video decoder) may select a probability model or "context model" that operates on context to code symbols associated with a block of video data. That is, the context model (Ctx) may be an index or offset that is applied to select one of a plurality of different contexts, each of which may correspond to a particular probability model.

In some instances, a single context may be used to code data that indicates a run value. For example, a binarized run value may include a first bin that indicates whether the run value is greater than zero, a second bin that indicates whether the run value is greater than one, a third bin that indicates whether the run value is greater than two, and any other bins needed to represent the run value. In this example, the same context may be used to context code the first three bins of the binarized run value. However, using the same probability model to code multiple bins may create a delay between successive coding cycles. Moreover, the correlation of bins of a run value may not be sufficient to warrant the time and computational resources associated with updating the probability model.

According to aspects of this disclosure, context may be selected based on the index value of the run value being coded. For example, a video coder may determine a run value that indicates a run-length of a run of a palette index of a block of video data. The video coder may also determine a context for context adaptive coding data that represents the run value based on the palette index value. The techniques may improve coding efficiency.

In some examples, the palette index used to derive contexts for run coding may be a palette index that is used to retrieve a color value from the palette. In other examples, the palette index used to derive contexts for run coding may be a parsed palette index, i.e., the palette index signaled in a bitstream (which may be different than the palette index that is used to access the palette colors, as described in greater detail below).

In some examples, three contexts may be used to code a run value. In such examples, according to aspects of this disclosure, a video coder may select a first context to code the run value based on the index being greater than zero. The video coder may select a first context to code the run value based on the index being greater than zero. The video coder may select a second context to code the run value based on the index being greater than one. The video coder may select a third context to code the run value based on the index being greater than two. With respect to the three context coded bin example described above, the video coder may select the three contexts for coding any combination of the three bins. While the example above is described with respect to defining three contexts associated with three characteristics of the index value, it should be understood that the techniques described herein may be extended to defining other numbers of contexts based on other characteristics of the index value.

Other aspects of this disclosure are directed to coding runs of palette indices that are coded using more than one palette mode. In general, indices that are coded using different palette modes may not be coded in the same run. In an example for purposes of illustration, a run coded using the CopyFromTop mode may not include any indices that are coded in as escape samples. In this example, a pixel coded as an escape sample may terminate a run, which may adversely impact coding efficiency due to relatively shorter runs for a given block.

According to aspects of this disclosure, a run may include samples that are coded using more than one palette mode. For example, a video coder may determine palette indices of a first row of a block of video data, where the palette indices include one or more indices that are associated with a color value in the palette and a syntax element that is not associated with a color value in the palette (which may be referred to as a palette index despite the syntax element not necessarily corresponding to an index value). The video coder may also code a run of palette indices of a second row of the block of video data relative to the palette indices of the first row, where the run includes the one or more indices that are associated with a color value in the palette and the syntax element that is not associated with a color value in the palette.

In some examples, the run of palette indices may include pixels that are coded with both CopyFromTop mode and as escape samples, e.g., using Escape mode. For example, the indices that are associated with a color value in the palette may be coded with CopyFromTop mode and the syntax element that is not associated with a color value in the palette may be coded as an escape sample. In some examples, as described in greater detail below, the syntax element may be associated with an index that is not associated with a color value in the palette. In some examples, the values of pixels coded as escape samples may be signaled following the run of indices, and the pixels coded as escape samples are not required to be the same. In other examples, an escape sample may be represent by CopyFromTop mode and an escape sample may be included in the same group of pixels along with the non-escape coded samples (e.g., pixels for which color values are represented in the palette), where the group of pixels is identified by a run value. In this way, the techniques may be used to increase the length of runs, which may improve coding efficiency.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients.

With respect to CABAC, as an example, video encoder 20 and video decoder 30 may select a probability model (also referred to as a context model) to code symbols associated with a block of video data based on context. For example, a context model (Ctx) may be an index or offset that is applied to select one of a plurality of different contexts, each of which may correspond to a particular probability model. Accordingly, a different probability model is typically defined for each context. After encoding or decoding the bin, the probability model is further updated based on a value of the bin to reflect the most current probability estimates for the bin. For example, a probability model may be maintained as a state in a finite state machine. Each particular state may correspond to a specific probability value. The next state, which corresponds to an update of the probability model, may depend on the value of the current bin (e.g., the bin currently being coded). Accordingly, the selection of a probability model may be influenced by the values of the previously coded bins, because the values indicate, at least in part, the probability of the bin having a given value. The context coding process described above may generally be referred to as a context-adaptive coding mode.

Hence, video encoder 20 may encode a target symbol using a probability model. Likewise, video decoder 30 may parse a target symbol using the probability model. In some instances, video encoder 20 may code syntax elements using a combination of context adaptive and non-context adaptive coding. For example, video encoder 20 may context code bins by selecting a probability model or "context model" that operates on context to code the bins. In contrast, video encoder 20 may bypass code bins by bypassing, or omitting the regular arithmetic coding process when coding the bins. In such examples, video encoder 20 may use a fixed probability model to bypass code the bins. That is, bypass coded bins do not include context or probability updates.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

HEVC contains several proposals to make the codec more parallel-friendly, including tiles and wavefront parallel processing (WPP). HEVC WD10 defines tiles as an integer number of coding tree blocks co-occurring in one column and one row, ordered consecutively in a coding tree block raster scan of the tile. The division of each picture into tiles is a partitioning. The number of tiles and the location of their boundaries may be defined for the entire sequence or changed from picture to picture. Tile boundaries, similarly to slice boundaries, break parse and prediction dependences so that a tile can be processed independently, but the in-loop filters (de-blocking and sample adaptive offset (SAO)) can still cross tile boundaries. HEVC WD10 also specifies some constraints on the relationship between slices and tiles.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples, video encoder 20 and video decoder 30 may be configured to construct a palette using palette entries from one or more previously coded blocks. For example, video encoder 20 and video decoder 30 may be configured to copy one or more a palette entries for coding a current block from a predictor palette that includes palette entries from blocks previously coded using palette mode or other reconstructed samples. For each entry in the predictor palette, video encoder 20 and video decoder 30 may be configured to code a binary flag to indicate whether the entry associated with the flag is copied to the current palette (e.g., indicated by flag=1). The string of binary flags may be referred to as the binary palette prediction vector. The palette for coding a current block may also include a number of new palette entries, which may be explicitly coded (e.g., separately from the palette prediction vector).

As noted above, video encoder 20 and video decoder 30 may use a number of different palette coding modes to code indices of a palette. For example, video encoder 20 and video decoder 30 may use an Escape mode, a CopyFromTop mode (also referred to as CopyAbove mode), or a Value mode (also referred to as Index mode) to code indices of a block. In general, coding a sample using "Escape mode" may generally refer coding a sample of a block that does not have a corresponding color represented in a palette for coding the block. As noted above, such samples may be referred to as escape samples or escape pixels.

As another example, in a third screen content coding core experiment, subtest B.6, as described in Yu-Wen Huang et al., "Description of Screen Content Core Experiment 3 (SCCE3): Palette Mode," JCTVC-Q1123, Valencia, ES, 27 Mar.-4 Apr. 2014 (hereinafter Q1123), another mode was introduced into the software released by Canon on 26 May 2014. The macro for this mode may be defined as "CANON_NEW_RUN_LAST_TRANSITION" and may be referred to herein as Transition Run mode. The Transition Run may be similar to Value mode in that video encoder 20 or video decoder 30 may code an index value followed by a run specifying the number of subsequent samples that have the same palette index.

One difference between Value mode and the Transition Run mode is that the index value of the transition run mode is not signaled in the bitstream. Rather, video encoder 20 and video decoder 30 may infer the index value for the Transition Run mode. As described herein, inferring a value may refer to the determination of a value without reference to dedicated syntax that represents the value that is coded in a bitstream. That is, video encoder 20 and video decoder 30 may infer a value without coding a dedicated syntax element for the value in a bitstream. The inferred index may be referred to as a transition index.

In some examples, there may be two ways of signaling the palette modes. A first technique for signaling palette modes may be referred to as explicit escape signaling. For example, in JCTVC-Q0094, if the macro "PLT_REMOVE_ESCAPE_FLAG" is zero, video encoder 20 may explicitly encode an escape flag for each sample of a block to indicate whether a sample being coded in a block is coded in Escape mode. If the sample is not coded with Escape mode, video encoder 20 may encode additional data to indicate whether the mode is CopyFromTop or Value. In some instances, the additional data may be a flag, referred to herein as an SPoint flag (e.g., an SPoint flag value of zero may indicate CopyFromTop mode and an SPoint flag value of one may indicate Value mode, or vice versa).

Hence, with the explicit escape signaling, the SPoint flag may be used to indicate a particular run type for a run of pixel values associated with the indicated mode. For example, video encoder 20 may encode an SPoint flag to indicate whether the index currently being coded and the run of subsequent index values being coded in a run are coded using CopyFromTop mode or Value mode. Video encoder 20 does not encode the escape flag (e.g., "PLT_REMOVE_ES-CAPE_FLAG") and the SPoint flag (when necessary) for the subsequent run samples. That is, video encoder 20 and video decoder 30 may infer the values of the escape flag and SPoint flag for samples included in a run. For example, video encoder 20 and video decoder 30 may determine the value of the escape flag and SPoint flag for samples included in the run without reference to dedicated syntax that represent such values in the bitstream.

A second technique for signaling palette modes may be referred to as implicit escape signaling. For example, if the macro "PLT_REMOVE_ESCAPE_FLAG" from JCTVC-Q0094 is one, video encoder 20 and video decoder 30 may be configured to increase the number of palette entries of a palette by one to accommodate a special index to the palette that does not correspond to any of the indices of the block. In some examples, video encoder 20 and video decoder 30 may include the additional index as the last palette index in the increased palette for a given block. The additional index may be used as an indication of an escape sample.

In this implicit escape signaling, video encoder 20 may encode, for a particular sample value of a block, data that represents the additional index to indicate that the additional sample is coded using Escape mode. Video encoder 20 may also encode the color value of the escape sample. Accordingly, in the case of implicit escape signaling, there are only two possible modes (e.g., CopyFromTop mode or Value mode) to be signaled using explicit syntax. For example, only the SPoint flag may signaled to distinguish between the modes. If a sample is coded in Value mode and the index for Value mode is equal to the escape index (e.g., the above-noted additional index to the palette), video encoder 20 and video decoder 30 may infer the sample to be coded in Escape mode. In this case no run is signaled. When using the implicit escape signaling with the Transition Run mode, the SPoint flag may take values 0 (e.g., Value mode), 1 (e.g., CopyFromTop mode) or 2 (e.g., Transition Run mode).

The techniques described in this disclosure may include techniques for various combinations of one or more of palette prediction and signaling of palette indices with implicit escape signaling. For example, aspects of this disclosure relate to resetting a predictor palette. For example, resetting a predictor palette may include setting the size of the predictor palette to zero, such that the predictor palette may not be used to construct a palette for a block currently being coded. In this case, a binary palette prediction vector is not signaled in a bitstream and no palette entries are predicted from the predictor palette.

In JCTVC-Q0094, a predictor palette is reset for a coding tree block (CTB) at the left edge of the picture (e.g., at the beginning of a row of CTBs in a picture ("CTB row")). The rational for resetting the predictor palette at the beginning of a CTB row may be twofold. First, after coding a line of CTBs, the predictor palette may include palette entries that mostly belong to palettes of blocks located at the right side of the picture. Accordingly, the predictor palette may not be very effective at predicting a current palette for a first CTB of a CTB row, which may be positioned at the left side of the picture (e.g., the colors of pixels at the left side of a picture may differ from the colors of pixels at the right side of the picture). In addition, when two or more wavefronts are being used for coding a particular picture, in addition to the CABAC states, it would be necessary to propagate information about the predictor palette between wavefronts.

For example, a wavefront may be a unit of video data for coding, and may be coded in parallel with other wavefronts. For example, two parallelization approaches are included in HEVC, including Wavefront Parallel Processing (WPP) and Overlapped Wavefront (OWF). WPP allows creating picture partitions that can be processed in parallel without incurring high coding losses. In WPP rows of CTBs are processed in parallel while preserving all coding dependencies. OWF allows for overlapping the execution of consecutive pictures using wavefronts.

However, in some instances, resetting a predictor palette may lead to coding losses. For example, without a predictor palette, video encoder 20 and video decoder 30 may code data that indicates all of the entries of a palette (e.g., all of the palette indices and related color values) in a bitstream. This palette data may be a relatively large amount of data relative to predicted palette entries, which may be indicated in the bitstream using a single flag. Accordingly, resetting a predictor palette may adversely affect the bitrate of video data coded with palette-based coding.

According to aspects of this disclosure, video encoder 20 and video decoder 30 may be configured to disable the resetting of a predictor palette based on the number of wavefronts that are used to code a picture being one or zero (i.e., no wavefronts). That is, video encoder 20 and video decoder 30 may be configured not to reset a predictor palette when one or zero wavefronts are used to code a picture. However, video encoder 20 and video decoder 30 may be configured to enable the resetting of a predictor palette when two or more wavefronts are used to code a picture. In this example, video encoder 20 and video decoder 30 may not need to propagate information about a predictor palette between wavefronts, while still avoiding coding losses in the single wavefront case.

According to aspects of this disclosure, when multiple tiles and multiple wavefronts are used to code a picture (e.g., video encoder 20 and video decoder 30 use two or more tiles and two or more wavefronts to code the picture), video encoder 20 and video decoder 30 may be configured to reset the predictor palette at the beginning of each tile CTB row. A tile CTB row may include CTBs from a CTB row that belong to a particular tile. It should be understood that a "row" may be oriented vertically or horizontally, depending on a particular scan order used to code blocks. A row may also be referred to herein as a line, and the terms may be used interchangeably herein.

The techniques described above may also be applied to a palette transition table. For example, standard submission document Yu-Chen Sun et al., "CE6 Test C.2 Transition Copy Mode." JCTVC-S0078, Strasbourg, FR, 17-24 October (JCTVC-S0078) describes a transition copy mode. The transition copy may also be referred to as a transition copy run (TC run) mode. In the TC run mode, a decoder records the adjacent color index patterns and uses the patterns to predict to-be-coded indices. In the TC run mode, as an example, a current pixel, C, has a pilot color index equal to one. From a causal area of coded pixels, a video coder (such as video encoder 20 or video decoder 30) may determine that a color index to the right of a color index that is equal to one is likely to be two (e.g., assuming a left to right scan). This transition pattern from one to two may be recorded in a transition copy table (TC table) to enhance color index prediction efficiency.

In JCTVC-S0078, a TC table is reset when a current CU being coded is the first CU of the slice, or the current CU inherits the TC table of the previous CU when the current CU is a non-first CU of the slice. This inheriting property may be referred to as "TC table propagation." The TC table may be maintained and updated as the pixels in the CU are coded.

In some examples, in the transition copy mode, two transition tables are maintained, one for even-indexed rows and the other for odd-indexed rows. Previous contributions described using a single transition table. Regardless, in general, as noted above, a transition table from a previous palette coded CU (or block) may be used to initialize the transition table for a current CU (or block) coded in palette mode.

According to aspects of this disclosure, the concept of resetting the palette at the beginning of a first CTB in a CTB row or the first CTB in a tile in a CTB row when multiple wavefronts are being used, as described above, may be extended to resetting the palette transition table (or tables) in those locations as well. For example, video encoder 20 and video decoder 30 may be configured to set all of the entries in a palette transition table to zero (or to any other fixed palette index, or any other pattern) for the first CTB in a CTB row or the first CTB in a tile in a CTB row when multiple wavefronts are being used (or, equivalently, the first palette-coded CUs within the CTBs). According to aspects of this disclosure, the resetting of the predictor palette and palette transition tables may be generalized to any other palette related data that may be propagated from one palette-coded CU to another.

In another example, video encoder 20 and video decoder 30 may be configured to code a flag of a video parameter set (VPS), sequence parameter set (SPS), picture parameter set (PPS), slice header, at a tile level, at a block level or elsewhere that indicates whether a predictor palette reset (and/or resetting of other information such as the above-noted palette transition tables) is performed at the beginning of each CTB row. In instances in which the flag is signaled at a tile level, the flag may indicate whether the predictor palette reset is performed at the beginning of each tile CTB row (e.g., at the beginning of each row of CTBs in a tile). Alternatively, for the first block coded using the palette mode in a row of CTBs, a flag may be signaled to indicate whether predictor palette reset is performed.

In another example, a flag (e.g., where a flag may be one or more syntax elements) may be signaled for each block coded using the palette mode to indicate whether predictor palette reset should be performed. In some examples, this technique may have an advantage of allowing video encoder 20 and video decoder 30 to be able to select between techniques that have all the palette entries explicitly signaled or techniques that use a predictor palette to predict some of the palette entries. In some examples, the flag value may be inferred. For example, video encoder 20 and video decoder 30 may be configured to infer the value of the flag for each wavefront, such that the inferred value indicates that the predictor palette is reset. Alternatively or additionally, video encoder 20 and video decoder 30 may be configured to infer the value of the flag for the first block of a slice or tile, such that the inferred value indicates that a predictor palette is reset in the beginning of each slice and/or tile.

In another example, rather than signaling a flag to indicate a predictor palette reset, video encoder 20 and video decoder 30 may be configured to reset a predictor palette according to a rule or set of rules. For example, video encoder 20 and video decoder 30 may both be configured to apply the rule or set of rules. In one example, video encoder 20 and video decoder 30 may be configured to apply the following rule to determine whether to reset a predictor palette: if the palette in the current block has no entries predicted from a predictor palette, the predictor palette is reset (e.g., the predictor palette is set to have a zero length) for this current block, such that only the current palette may be used as a predictor for the following blocks, but not the palette entries from previous blocks.

In the example above, video encoder 20 may control the palette resetting. For example, when the palette is to be reset, video encoder 20 may simply not use any entries from the predictor palette. One potential advantage of implementing this process is that no new syntax elements are added, and the palette resetting may be more granular and more flexibly controlled. For example, the flexibility/granularity may be achieved due to the ability to change the conditions upon which predictor palette resetting is performed.

In some examples, video encoder 20 may not use the predictor palette in at least one of the following cases: for the first LCU in each LCU row, when wavefront coding is enabled; for the first block in a tile, or for the first block in a slice.

According to aspects of this disclosure, a predictor palette may be reinitialized. For example, reinitializing the predictor palette may generally refer to replacing entries of the predictor palette with new entries. For example, after coding a block of indices a predictor palette may include a number of entries for predicting a palette of the next block to be coded. Reinitializing the predictor palette may include removing the number of entries and adding new entries to the predictor palette for predicting the palette of the next block to be coded.

In some examples, according to aspects of this disclosure, at the beginning of each CTB line, video encoder 20 and video decoder 30 may be configured to reinitialize a predictor palette for determining a current palette of a current CTB using palette entries from a first CTB of the CTB line above the current CTB, if the current CTB line is not the first CTB line in the picture/slice/tile. In this case, as described in greater detail with respect to the example of FIG. 5 below, after finishing the coding of the first CTB and before coding the second CTB in a CTB line above (provided the first CTB is not the first CTB line in the picture/slice/tile), video encoder 20 and video decoder 30 may be configured to use the predictor palette to reinitialize the predictor palette at the beginning of the current CTB line. If the current CTB line is the first one in the picture/slice/tile, video encoder 20 and video decoder 30 may be configured to set the number of predictor palette entries (e.g., as described in JCTVC-Q0094), and not predict any palette entries when determining the palette for the current CTB.

In another example, the concept of reinitializing a predictor palette may be generalized. For example, video encoder 20 and video decoder 30 may be configured to generate a predictor palette after coding N CTBs of a line of CTBs above a CTB currently being coded and before starting to code of the N+1$^{th}$ CTB in the CTB line above the CTB currently being coded (provided the line of CTBs is not the first CTB line in the picture/slice/tile). Video encoder 20 and video decoder 30 may be configured to reinitialize the predictor palette for determining the palette of the CTB currently being coded using the generated predictor palette. The CTB currently being coded may be the first CTB of a current CTB line (provided the current CTB is not the first CTB line in the picture/slice/tile). Here, N may be between one and the number of CTBs in the CTB line. To conceptually align this predictor palette re-initialization technique with wavefront coding, N may be selected to be less than or equal to two. In this way, the same predictor palette re-initialization process may be used regardless of the number of wavefronts used to code a picture.

As noted above, a CTB may also be referred to as a LCU. In some examples, the predictor palette re-initialization may be performed for the first CTB of a line of blocks in which a palette mode is used to predict any block of the CTB (e.g., in instances in which a variety of prediction (inter- or intra-modes) or palette modes may be used to code a CTB. While the examples above are described with respect to CTBs for purposes of illustration, it should be understood that the techniques may be extended to any type of block of video data.

According to aspects of this disclosure, the palette re-initialization process described above may be extended to palette transition tables. For example, video encoder 20 and video decoder 30 may be configured to reinitialize palette transition tables at the beginning of a current CTB row using the palette transition tables generated after coding N CTBs and before starting to code the N+1$^{th}$ CTB in the CTB line above the current CTB (provided the current CTB is not the first CTB line in the picture/slice/tile). Here, N may be between one and the number of CTBs in the CTB line. For example, video encoder 20 and video decoder 30 may be configured to select a value of N that is less than or equal to two.

In some examples, video encoder 20 and video decoder 30 may be configured to copy the size of the transition tables in addition to the palette transition tables themselves. Indeed, this process of re-initializing palette coding information (e.g., predictor palette information, palette transition table information, or the like) may be generalized to any other palette related data that is propagated from a palette-coded CU to the next palette-coded CU. For example, video encoder 20 and video decoder 30 may be configured to reinitialize palette related data for a current CTB based on palette data generated after coding N CTBs and before starting to code the N+1$^{th}$ CTB in the CTB line above the current CTB.

In some examples, video encoder 20 and video decoder 30 may be configured to use the re-initialization for all applicable CTBs (e.g., initially coded CTBs in a line of CTBs). In other examples, video encoder 20 and video decoder 30 may be configured to may only perform the re-initialization techniques when the number of wavefronts being used to code a picture or tile is two or more.

According to aspects of this disclosure, when tiles and wavefronts are being used together for coding a particular picture, video encoder 20 and video decoder 30 may be configured to apply the re-initialization techniques to tiles as though the tiles are separate pictures. For example, video encoder 20 and video decoder 30 may be configured to apply the above-described re-initialization process for a first tile CTB if the first tile CTB is not the first CTB line in the tile, as described in greater detail with respect to FIG. 7 below.

Other aspects of this disclosure relate to signaling escape samples in examples in which implicit escape signaling is used. For example, in JCTVC-Q0094, for the above-described implicit escape technique, the size of the palette is increased by one and the last index in the expanded palette is assigned to indicate whether a sample is coded as an escape sample. If truncated binary coding is used to code the indices, the last index may use one more bit than index zero. Similarly, if another variable length coding strategy is used, the difference in lengths may be even greater.

Typically, for certain block sizes, there may be more samples that are coded as escape samples than blocks of other sizes. To leverage this relationship to improve the coding of indices, video encoder 20 and video decoder 30 may be configured to assign the zero index of a palette to the index used to indicate an escape sample for blocks that are likely to have more pixels coded as an escape sample. For the other blocks that may have relatively fewer samples coded as escape samples, video encoder 20 and video decoder 30 may be configured to may follow the current scheme of assigning the highest index from the expanded palette to indicate an escape sample.

In an example for purposes of illustration, video encoder 20 and video decoder 30 may be configured to assign a zero index to the index used to indicate an escape sample for block sizes 32×32 and below. In this example, video encoder 20 and video decoder 30 may be configured to assign the highest (e.g., numerically largest of the palette indices) index to the index used to indicate an escape sample for 64×64 blocks and larger.

In some examples, video encoder 20 and video decoder 30 may be configured to implement the same Escape index assignment rule for each block size a-priori. In another example, an Escape index assignment rule may be signaled explicitly in a video parameter set (VPS), sequence parameter set (SPS), picture parameter set (PPS), slice header, at a tile level or elsewhere.

Other aspects of this disclosure relate to signaling escape samples in examples in which explicit escape signaling is used. In the case of explicit escape signaling, Escape mode may be signaled with a flag. According to aspects of this disclosure, video encoder 20 and video decoder 30 may be configured to context adaptively code the escape flags based on block size. For example, contexts may be designed to code escape flags in order to exploit the relationship that, for certain block sizes, there may be more samples coded using an escape sample relative to other block sizes. In this case, the context for the flag may depend on the block size. Additionally, in some examples, a palette size may have some correlation with the amount/number of escape samples to be signaled in the CU. Therefore, the context may depend on the palette size or on whether the palette size is equal to the maximum palette size (or not equal to the maximum palette size).

Other aspects of this disclosure relate to signaling run values for runs of indices coded using Value palette mode. For example, in standard submission document Guillaume Laroche et al., "AHG10: Run Coding for Palette Mode," JCTVC-Q0066. Valencia, ES, 27 Mar.-4 Apr. 2014 (JCTVC-Q0066), it is proposed that for each block coded using a palette, an index-threshold may be signaled. If the index being coded in Value mode is greater than or equal to the index-threshold, no run is signaled for the Value mode. This disclosure may refer to this method as "Limited Run."

According to aspects of this disclosure, modifications may be made to the process described in Q0066. In a first example, the first indices indicated by the syntax element num_skip, a run is always signaled. In some examples, the syntax element num_skip is equal to two, so run is always signaled for indices zero and one. The value indicated by the syntax element num_skip may be known to both video encoder 20 and video decoder 30 a-priori (e.g., predetermined at the video coders), or may be signaled explicitly in the video parameter set (VPS), sequence parameter set (SPS), picture parameter set (PPS), slice header, at a tile level or elsewhere.

In a second example, if the palette size is below a particular palette size threshold, the index threshold is not signaled and the run is signaled for each index. The palette size threshold may be known to both video encoder 20 and video decoder 30 a-priori or may be signaled explicitly in the video parameter set (VPS), sequence parameter set (SPS), picture parameter set (PPS), slice header, at a tile level or elsewhere.

In a third example, a flag may be signaled for every block where the palette size is greater than the palette size threshold, to indicate whether the index threshold is signaled. The flag may be signaled only for certain block sizes and/or palette sizes. If the index threshold is not signaled, the run is signaled for all indices. In an alternative example, instead of signaling an explicit flag, an index threshold of a palette size is signaled to indicate that run is signaled for all indices.

In a fourth example, truncated binarization (for example, truncated binary coding as described in U.S. Provisional Application No. 62/002,054, filed May 22, 2014) may be used to code the index-threshold for a block if the size of the palette is above the palette-size-threshold. If an explicit flag as in the third example above is signaled, the maximum value for truncated binarization is may be (current palette size−num_skip). If no explicit flag is being sent, the maximum value for truncated binarization may be (current palette size−num_skip+1).

In a fifth example, a run value may be coded after palette index rearranging, reordering or remapping. For example, some palette coding techniques may be used to group indices to have longer runs of indices. In one example, video encoder 20 and video decoder 30 may be configured to perform an adaptive scan of indices or apply a Burrows Wheeler transform.

In a sixth example, the index threshold may be signaled as (palette-size−index-threshold) in instances in which the explicit flag described above with respect to the third example is signaled. Similarly, the index threshold may be signaled as (palette-size+1−index-threshold) in instances in which such an explicit flag is not signaled. In some instances, video encoder 20 and video decoder 30 may be configured to code the index threshold or (palette-size−index-threshold) based on the block size and/or palette size. In some examples, a similar strategy may be used in instances in which an explicit flag is not signaled.

The techniques of the six above-described examples may be implemented by video encoder 20 and video decoder 30 individually or in combination. In addition, the techniques may be implemented selectively depending on the block size and/or palette size. Such a dependence on block size and/or palette size may be known to both video encoder 20 and video decoder 30 a-priori, or may be signaled explicitly in the video parameter set (VPS), sequence parameter set (SPS), picture parameter set (PPS), slice header, at a tile level or elsewhere.

In contrast to JCTVC-Q0066, according to aspects of this disclosure, the above-described techniques may be normative. For example, this means that a valid bitstream (e.g., a bitstream that is decodable by a decoder conforming to a particular standard) is not permitted to have an index for which run is not signaled to occur in consecutive positions and be coded using Value mode. That is, two consecutive positions having the same index value may not be coded using the Value mode. This constraint may be treated as a normative constraint on a bitstream. That is, a conforming bitstream shall not contain any two or more consecutive pixels coded with the Value mode having identical index values for which a run is not signaled. This enables the application of all the redundancy removals described in U.S. Provisional Application No. 62/002,054, filed May 22, 2014, as well as the removal of the so-called impossible index values described in C. Gisquet et al., "AHG10: Palette Index Coding," JCTVC-Q0064, Valencia, ES, 27 Mar.-4 Apr. 2014 (JCTVC-Q0064).

If the Transition Run mode is also used, the Limited Run technique may be extended to Transition Run mode as well. In this case, if the mode is Value or Transition Run and the palette index (for Value mode) or inferred palette index (for Transition Run mode) is above the index threshold, no run is signaled and the same normative bitstream constraint may be applied as descried above.

Other aspects of this disclosure relate to coding a run value that indicates a run-length of a run of palette indices. In example, the techniques may be used to code a run value of an index coded using Value mode.

For example, in some examples, three context coded flags may be used to coding a run value in Value mode. In such examples, the three context coded flags may include a greater than zero flag that indicates whether the run value is greater than zero, a greater than one flag that indicates whether the run value is greater than one, and a greater than two flag that indicates whether the run value is greater than two. In some examples, video encoder 20 and video decoder 30 may be configured to code each of the three flags using a single context.

However, using a single context may require video encoder 20 and video decoder 30 to update the probability model associated with the context after coding each of the flags. Furthermore, the probability updating process above may introduce delay into the coding process. In an example for purposes of illustration, three bins use the same context model (e.g., ctx(0)) for purposes of context adaptive coding. In this example, a first bin may use ctx(0) to determine a probability model for coding. The value of the first bin influences the probability model associated with ctx(0). Accordingly, a probability update is performed prior to coding the second bin with ctx(0). An additional probability update is also performed prior to coding the third bin with ctx(0). In this way, the probability update may introduce delay into the coding cycle.

Moreover, the correlation between the first bin, second bin, and third bin of a run value may be insufficient to warrant the time and computational resources associated with updating the probability model. That is, one potential benefit of context adaptive coding is the ability to adapt a probability model based on previously coded bins (given the same context). If the value of a first bin, however, has little bearing on the value of a subsequent bin, there may be little efficiency gain associated with the probability update. Accordingly, bins exhibiting a low correlation may not benefit from context adaptive coding as much as bins having relatively higher correlations.

According to aspects of this disclosure, video encoder 20 and video decoder 30 may be configured to determine a context for coding a run value based on the index of the run value. Additionally or alternatively, video encoder 20 and video decoder 30 may be configured to determine a context for coding a run value based on a block size of a block currently being coded, or a palette size of a palette for the block currently being coded. In some examples, aspects of this disclosure include using multiple contexts to code a run value.

In one example, according to aspects of this disclosure, video encoder 20 and video decoder 30 may be configured to use seven contexts for coding a run value. For example, seven contexts may be defined for coding a flag that indicates that a run value is greater than zero. This example is illustrated in Table 1 below:

TABLE 1

SEVEN CONTEXTS FOR CODING RUN BASED ON INDEX

| Index | Run context |
|---|---|
| 0 | 0 |
| 1 | 1 |
| 2 | 2 |
| 3 | 3 |
| [4, 7] | 4 |
| [8, 15] | 5 |
| [16, 31] | 6 |

While the example of Table 1 illustrates seven contexts, in other examples, an alternative number of contexts may be defined based on an index value of the run being coded. Table 1 may assume that the MAX_PLT_SIZE syntax element is 32.

In another example, video encoder 20 and video decoder 30 may be configured to use two contexts to code the run values for Value mode based on the index value. For example, for a Value mode index 0, video encoder 20 and video decoder 30 may be configured to use run context (0) to code data that indicates the run value. In this example, for all other Value indices, video encoder 20 and video decoder 30 may be configured to use run context (1) to code data that indicates the run value.

In another example, video encoder 20 and video decoder 30 may be configured to use two contexts to code the run values in Value mode based on the index value. In this examples, for Value indices 0 and 1, video encoder 20 and video decoder 30 may be configured to use run context (0) to code data that indicates the run value. For Value indices greater than 1, video encoder 20 and video decoder 30 may be configured to use run context (1) to code data that indicates the run value.

In still another example, video encoder 20 and video decoder 30 may be configured to use three contexts to code the run values in Value mode based on the index value. For example, for Value index 0, video encoder 20 and video decoder 30 may be configured to use run context (0) for coding the data that indicates the run. For Value indices of 1 and 2, video encoder 20 and video decoder 30 may be configured to use run context (1) to code the data that indicates the run. For Value indices greater than 2, video encoder 20 and video decoder 30 may be configured to use run context (2) to code the data that indicates the run value.

In still another example, three contexts may be used to code the run values in Value mode based on the index value. For example, for Value indices 0 and 1, video encoder 20 and video decoder 30 may be configured to use run context (0) to code data that indicates the run value. For Value indices in the range from 2 to 5, inclusive, video encoder 20 and video decoder 30 may be configured to use run context (1) to code data that indicates the run value. For Value indices greater than 5, video encoder 20 and video decoder 30 may be configured to use run context (2) to code data that indicates the run value.

In another example, four contexts may be used to code the run values in Value mode depending on (e.g., based on) the index value. For example, for Value index 0, video encoder 20 and video decoder 30 may be configured to use run context (0) to code data that indicates the run value. For Value indices 1 and 2, video encoder 20 and video decoder 30 may be configured to use run context (1) to code data that indicates the run value. For Value indices in the range from 3 to 6, inclusive, video encoder 20 and video decoder 30 may be configured to use run context (2) to code data that indicates the run value. For Value indices greater than 6, video encoder 20 and video decoder 30 may be configured to use run context (3) to code data that indicates the run value may be used. In some instances, any combination of the above techniques may be used to determine context.

The above-described techniques may be used to code any combination of bins of a binarized run value. For example, as noted above, a binarized run value may include a first bin that indicates whether the run value is greater than zero, a second bin that indicates whether the run value is greater than one, a third bin that indicates whether the run value is greater than two, and any other bins needed to represent the run value. According to aspects of this disclosure, video encoder 20 and video decoder 30 may be configured to select the above-defined contexts for coding the first bin of the binaraized run value, the second bin of the binarized run value, the third bin of the binarized run value, or any combination thereof. The techniques may also be applied to other binarizations of a run value.

According to aspects of this disclosure, the context may be based on an actual index value or an adjusted index value. For example, in one example, the run contexts may depend on the syntax element adjusted_palette_index rather than the syntax palette_index, where the syntax element adjusted_palette_index may indicate an adjusted index based on the following conditions:

If (adjusted_palette_index>=adjustedRefIndex) then palette_index=adjusted_palette_index+1

Otherwise, (palette_index=adjusted_palette_index)

as described in Wei Pu et al., "SCCE3: Test B.12—Binarization of Escape Sample and Palette Index," JCTVC-R0065, Sapporo, JP, 30 Jun.-9 Jul. 2014 (JCTVC-R0065). That is, according to aspects of this disclosure, video encoder 20 and video decoder 30 may be configured to determine context for coding a run value based on a palette index signaled in a bitstream (which may be associated with the adjusted_palette_index syntax element) rather that the palette index actually used to code a sample in a block, in instances in which an adjusted palette index is signaled in the bitstream.

In another example, if a truncated binary code is used in coding the index, video encoder 20 and video decoder 30 may be configured to select the run contexts based on the first 'k' bits of the index syntax (e.g., as described, for example, in Section 9.3.3.x of JCTVC-R0065). For example, using truncated binary code, the syntax element to represent a palette index may use k bits or k+1 bits, based on the relative value of the palette index to the variable u, described below (as described in Section 9.3.3.x of JCTVC-R0065)):

Input to this process is a request for a TB binarization for a syntax element with value synVal, cMax. Output of this process is the TB binarization of the syntax element.

Let n=cMax+1, k=floor(log 2(n)) such that $2^k \le n < 2^{k+1}$ and let u=$2^{k+1}$−n.

If synVal<u, the TB bin string is specified by the binary representation of synVal with length k.

Otherwise, the TB bin string is specified by the binary representation of synVal+u with length k+1.

In this example, the run contexts only depend on the first k decoded bits. Hence, for example, video decoder 30 does not need to wait to decode the possible k+1 bit prior to determining the contexts.

In another example, video encoder 20 and video decoder 30 may be configured to use multiple contexts based on the index value, the size of the palette of a block currently being coded, and/or a size of the block currently being coded. If the Limited Run mode described above is used to code a block, video encoder 20 and video decoder 30 may be configured to select context based on the index value, the size of the block, and/or the index threshold above which a run is not signaled.

If the Transition Run mode is also used, this technique may be extended to the Transition Run mode as well. In this case, for the Transition Run mode, video encoder 20 and video decoder 30 may be configured to determine contexts for coding the run based on the index value, the size of the block, and/or the index threshold above which a run is not signaled. In this case, separate sets of contexts may be used for runs corresponding to Value mode and Transition Run mode.

Other aspects of this disclosure relate to coding runs of palette indices that are coded using more than one palette mode. For example, in the CopyFromTop mode described in JCTVC-Q0094, it is not possible to copy a sample coded as an escape sample or an escape flag from the line. One example of two rows of indices is shown in Table 2 below:

TABLE 2

EXAMPLE INDICES

| Line above   | 1 | 2 | 2 | 4 | ESC | 5 | 1 |
| Current line | 1 | 2 | 2 | 4 | ESC | 5 | 2 | where the numerical values represent indices and ESC represents a sample coded as an escape sample. In this example, starting from the leftmost sample in the above example, as per JCTVC-Q0094, video encoder 20 may signal CopyFromTop mode. Video encoder 20 may also signal a run value of three, as copying escape values or flags is not permitted. Accordingly, the sample coded in as an escape sample terminates the run.

Standard submission document Jianqing Zhu et al., "AHG10: Modified Copy Above Mode for Palette Based Coding," JCTVC-Q0174, Valencia, ES, 27 Mar.-4 Apr. 2014 (JCTVC-Q0174) describes allowing copying of escape values (e.g., the actual pixel values) in a run. However, this technique requires that the values associated with the escape samples are identical.

According to aspects of this disclosure, video encoder 20 and video decoder 30 may be configured to code data indicating more than one palette mode in a run of indices. For example, video encoder 20 and video decoder 30 may be configured to copy escape flags (in explicit escape signaling) or an escape index (in implicit escape signaling) with other indices that have associated color values in a palette. With respect to the example of Table 2 above, video encoder 20 may be configured to signal CopyFromTop mode followed by data that indicates a run value of six. This technique may achieve the advantage of increasing the size of runs, which may result in improved data compression.

According to aspects of this disclosure, during the run of indices coded relative to indices of another row, if a sample of the run has a sample located directly above the sample that is coded as an escape sample, video encoder 20 and video decoder 30 may be configured to infer that the sample is coded as an escape sample. In this example, the actual value of the sample may be signaled following the run.

In some examples, video encoder 20 and video decoder 30 may be configured not to use CopyFromTop mode for a sample if the above-neighboring sample (e.g., the sample located directly above the sample being coded) is coded as an escape sample. In instances in which samples coded as escape samples are permitted to be included in a run associated with the CopyFromTop palette mode (as described above) some redundancies associated with signaling the Escape mode may be removed. In a first example, according to aspects of this disclosure, if the sample that follows a run of indices has an above-neighboring sample that is coded as an escape sample, video encoder 20 and video decoder 30 may be configured not to code the following sample as an escape sample. In this example, the sample may not be coded as an escape sample, because it would otherwise be included in the CopyFromTop run. In this example, video encoder 20 and video decoder 30 may be configured to skip the coding of an escape flag or an escape index, because video encoder 20 and video decoder 30 may be configured to infer that the sample is not coded as an escape sample.

For the same reasons as the above-described example, video encoder 20 and video decoder 30 may be configured not to code a sample using the CopyFromTop mode following a CopyFromTop run. Accordingly, video encoder 20 and video decoder 30 may be configured to skip the coding of a mode-related syntax element (e.g., a flag that differentiates between CopyFromTop or Value modes), and video encoder 20 and video decoder 30 may be configured to infer that the sample is coded in Value mode.

In a second example, if the last sample included into CopyFromTop run is an escape sample and the following sample is coded with the Value mode, video encoder 20 and video decoder 30 may be configured to adjust the index of the Value mode (as well as the maximum possible indices number that may be used in the truncated binarization to code the Value index) by checking the index value of the above-neighboring sample to the following sample. In this case, if the above-neighboring pixel has an index, then video encoder 20 and video decoder 30 may be configured to reduce the Value index by one if the value of the index is greater than the index above. Video encoder 20 and video decoder 30 may be configured to reduce the maximum possible indices number by one to code the index. In the reconstruction stage, video decoder 30 may check the decoded index value to determine whether the index is greater or equal to the above-neighboring index, and, if so, increase the decoded value by one.

Figure 2:
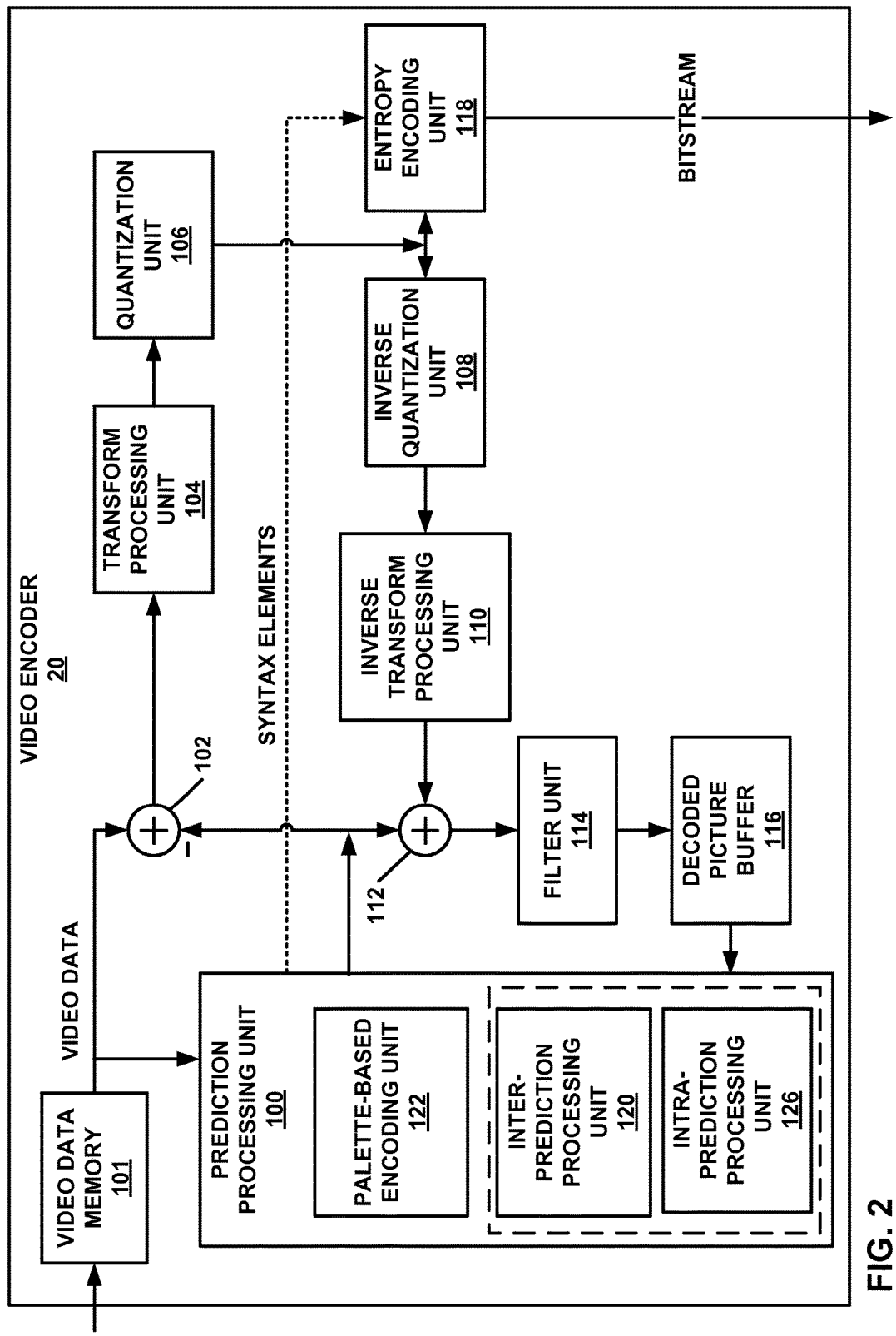
FIG. 2 is a block diagram illustrating an example video encoder that may implement the techniques described in this disclosure.

FIG. 2 is a block diagram illustrating one example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video encoder 20, in one example, may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described herein. For example, as described with respect to FIGS. 4-7 below, according to aspects of this disclosure, palette-based encoding unit 122 may be configured to reinitialize a predictor palette for constructing a palette for a block of video data based on one or more blocks of another line. For example, as described herein, palette-based encoding unit 122 may determine a first palette for a first block of video data that is located in a first row of blocks. Palette-based encoding unit 122 may also generate a predictor palette when encoding one or more other blocks in the first row. Upon coding a block in a second row, palette-based encoding unit 122 may reinitialize the predictor palette for determining a palette of the block in the second row based on the entries of the first palette.

In another example, palette-based encoding unit 122 may be configured to encode a run of indices that includes samples coded using more than one palette mode. For example, palette-based encoding unit 122 may determine palette indices of a first row of a block of video data, where the palette indices include one or more indices that are associated with a color value in the palette and a syntax element that is not associated with a color value in the palette. Palette-based encoding unit 122 may also encode a run of palette indices of a second row of the block of video data relative to the palette indices of the first row, where the run includes the one or more indices that are associated with a color value in the palette and the syntax element that is not associated with a color value in the palette.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data.

To perform CABAC, entropy encoding unit 118 may select a context model to apply to a certain context to encode symbols to be transmitted. According to aspects of this disclosure, entropy encoding unit 118 may be configured to use context based on the index value of the run value being coded. For example, entropy encoding unit 118 may be configured to determine a run value that indicates a run-length of a run of a palette index of a block of video data. Entropy encoding unit 118 may be configured to determine a context for context adaptive coding data that represents the run value based on the palette index value.

Video encoder 20 may output a bitstream that includes entropy-encoded data generated by entropy encoding unit 118. For instance, the bitstream may include data that represents a RQT for a CU.

Figure 3:
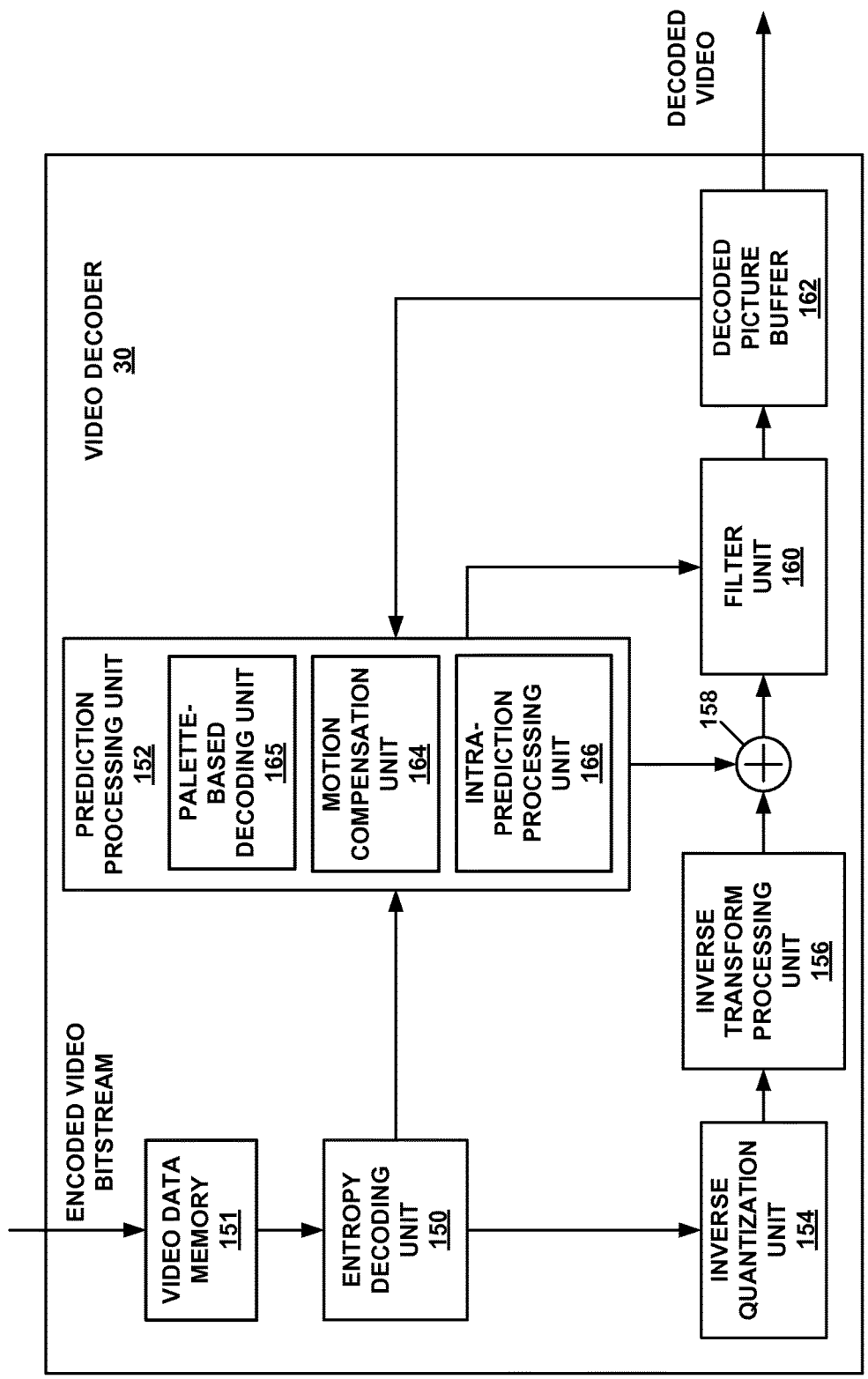
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video encoder 30 represents an example of a device that may be configured to perform techniques for palette-based video coding in accordance with various examples described in this disclosure. For example, video encoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some pixel locations in a block of video data with entries in the palette, select pixel values in the palette based on the information, and reconstruct pixel values of the block based on the selected pixel values in the palette.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units.

According to aspects of this disclosure, entropy decoding unit 150 may be configured to use context based on the index value of the run value being coded. For example, entropy decoding unit 150 may be configured to determine a run value that indicates a run-length of a run of a palette index of a block of video data. Entropy decoding unit 150 may be configured to determine a context for context adaptive coding data that represents the run value based on the palette index value.

Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize. i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma. Cb, and Cr blocks in decoded picture buffer 162, intra prediction or inter prediction operations on PUs of other CUs.

As noted above, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode. The block of video data may be, for example, a CU or PU generated according to an HEVC coding process.

According to aspects of this disclosure, palette-based decoding unit 165 may be configured to perform any combination of the techniques for palette coding described herein. For example, as described with respect to FIGS. 4-7 below, according to aspects of this disclosure, palette-based decoding unit 165 may be configured to reinitialize a predictor palette for constructing a palette for a block of video data based on one or more blocks of another line. For example, as described herein, palette-based decoding unit 165 may determine a first palette for a first block of video data that is located in a first row of blocks. Palette-based decoding unit 165 may also generate a predictor palette when decoding one or more other blocks in the first row. Upon coding a block in a second row, palette-based decoding unit 165 may reinitialize the predictor palette for determining a palette of the block in the second row based on the entries of the first palette In another example, as described with respect to FIG. 8 below, palette-based decoding unit 165 may be configured to decode a run of indices that includes samples coded using more than one palette mode. For example, palette-based decoding unit 165 may determine palette indices of a first row of a block of video data, where the palette indices include one or more indices that are associated with a color value in the palette and a syntax element that is not associated with a color value in the palette. Palette-based decoding unit 165 may also decode a run of palette indices of a second row of the block of video data relative to the palette indices of the first row, where the run includes the one or more indices that are associated with a color value in the palette and the syntax element that is not associated with a color value in the palette.

Figure 4:
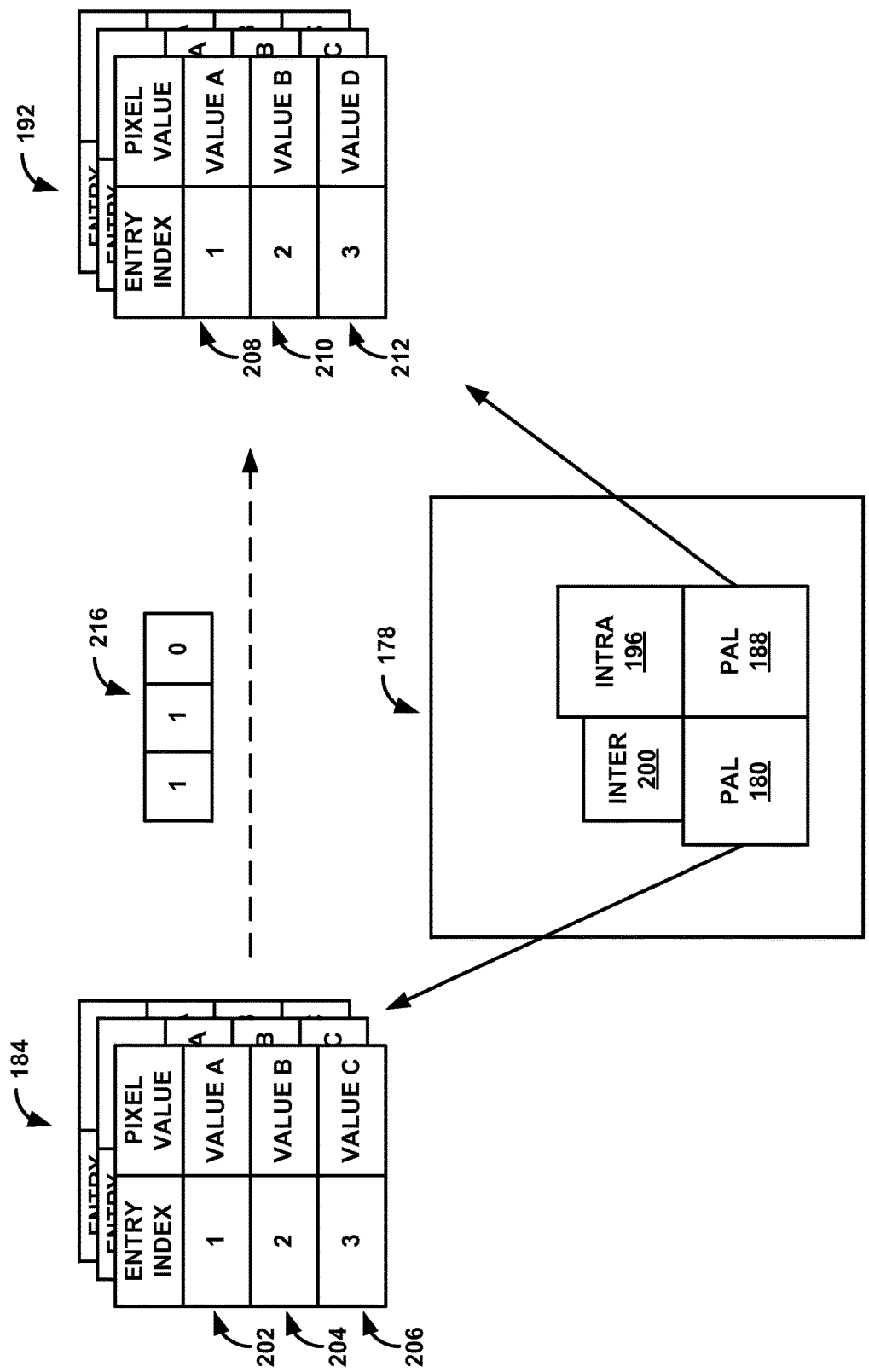
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. The combination of entries being used for purposes of prediction may be referred to as a predictor palette.

In the example of FIG. 4, second palettes 192 include three entries 208-212 having entry index value 1, entry index value 2, and entry index value 3, respectively. Entries 208-212 relate the index values to pixel values including pixel value A, pixel value B, and pixel value D, respectively. In this example, video encoder 20 may code one or more syntax elements indicating which entries of first palettes 184 (representing a predictor palette, although the predictor palette may include entries of a number of blocks) are included in second palettes 192.

In the example of FIG. 4, the one or more syntax elements are illustrated as a vector 216. Vector 216 has a number of associated bins (or bits), with each bin indicating whether the predictor palette associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector. The vector may be referred to as a palette prediction vector.

In some examples, as noted above, video encoder 20 and video decoder 30 may determine a predictor palette (which may also be referred to as a predictor palette table or predictor palette list) when performing palette prediction. The predictor palette may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the predictor palette are to be copied to a palette for coding a current block.

According to aspects of this disclosure, a predictor palette (such as the predictor palette associated with vector 216) may be reinitialized for generating a palette associated with certain blocks in a picture and/or tile of video data. For example, as described in greater detail with respect to the examples of FIGS. 5-7 below, a predictor palette for constructing a palette for a block of video data in a first line may be reinitialized based on one or more blocks of another line. In one example, video encoder 20 and video decoder 30 may determine a first palette for a first block of video data that is located in a first row of blocks. Video encoder 20 and video decoder 30 may also generate a predictor palette when coding one or more other blocks in the first row. Upon coding a block in a second row, video encoder 20 and video decoder 30 may reinitialize the predictor palette for determining a palette of the block in the second row based on the entries of the first palette.

FIG. 5 is a conceptual diagram illustrating example tiles in accordance with the High Efficiency Video Coding (HEVC) standard. HEVC contains several proposals to make the codec more parallel-friendly, including tiles and Wavefront parallel processing (WPP). HEVC WD10 defines tiles as an integer number of CTBs co-occurring in one column and one row, ordered consecutively in a CTB raster scan of the tile. The division of each picture into tiles may be referred to as a partitioning. Tiles in a picture are ordered consecutively in the tile raster scan of the picture as shown in FIG. 5.

For example, FIG. 5 illustrates an example CTB coding order for a picture 220 that is partitioned into multiple tiles 222A, 222B, 222C, 222D, 222E, 222F. 222G, 222H, and 222I (collectively, "tiles 222"), with tile boundaries indicated by the thick lines. Each square block in picture 220 represents a pixel block associated with a CTB. The numbers in the pixel blocks indicate positions of the corresponding CTBs (e.g., LCUs) in a tile coding order for picture 220.

As illustrated in the example of FIG. 5, CTBs in tile 222A are coded first, followed by CTBs in tile 222B, followed by CTBs in tile 222C, followed by CTBs in tile 222D, followed by CTBs in tile 222E, followed by CTBs in tile 222F, followed by CTBs in tile 222G, followed by CTBs in tile 222H, followed by CTBs in tile 222I. The order of processing tiles 222 is generally illustrated by the numbers included in tiles 222. Within each of tiles 222, the CTBs are coded according to a raster scan order.

The number of tiles and the location of their boundaries may be defined for the entire sequence or changed from picture to picture. Tile boundaries, similarly to slice boundaries, break parse and prediction dependences so that a tile can be processed independently. However, in some instances, in-loop filters (e.g., de-blocking and sample adaptive offset (SAO) filters) may still cross tile boundaries.

Using tiles may enhance parallelism, because no (or relatively little) communication is needed between processors or processor cores for entropy decoding and motion compensation reconstruction. In addition, tiles may exhibit a relatively better coding efficiency when compared to slices, because tiles allow picture partition shapes that contain samples with potentially higher correlation than slices. Tiles may also reduce slice header overhead.

According to aspects of this disclosure, video encoder 20 and video decoder 30 may reinitialize a predictor palette for determining a palette of a CTB based on a palette of another CTB. In an example for purposes of illustration, video encoder 20 and video decoder 30 may be configured to reinitialize a predictor palette for determining a current palette of a current CTB at the beginning of each CTB line. Video encoder 20 and video decoder 30 may reinitialize the predictor palette using palette entries from a first CTB of the CTB line above the current CTB, In an example for purposes of illustration, after coding CTB (4) (of tile 222A) using palette-based coding, video encoder 20 and video decoder 30 may be configured to generate a predictor palette for determining a palette of CTB (5) (of tile 222A). In addition, video encoder 20 and video decoder 30 may be configured to update the predictor palette after coding each of CTB (5), CTB (6), and CTB (7) using a palette-based coding mode. That is, video encoder 20 and video decoder 30 may replace or add one or more entries of the predictor palette after coding each of CTB (5), CTB (6), and CTB (7).

According to aspects of this disclosure, when coding CTB (8) of the CTB line below the CTB line that includes CTB (4) (assuming the raster scan order), video encoder 20 may reinitialize the predictor palette prior to generating a palette for coding CTB (8). For example, rather than using the predictor palette as previously updated based on CTB (7), video encoder 20 and video decoder 30 may reinitialize the predictor palette based on entries of a palette associated with the first CTB of the above-neighboring CTB row, i.e., CTB (4). In this manner, the predictor palette for generating the palette for CTB (8) may be more likely to have colors similar to those used in CTB (8), because CTB (4) is located spatially closer to CTB (4) than CTB (7).

As noted above, video encoder 20 and video decoder 30 may reinitialize the predictor palette based on entries of a palette of the first CTB of the above-neighboring CTB row, i.e., CTB (4). According to some examples, video encoder 20 and video decoder 30 may be configured to reinitialize the predictor palette for CTB (8) (e.g., the predictor palette used to generate a palette for coding samples of CTB (8) by replacing entries of the predictor palette with entries from the palette used to code CTB (4).

In another example, according to aspects of this disclosure, video encoder 20 and video decoder 30 may be configured to reinitialize the predictor palette in based on a predictor palette associated with CTB (4) that includes entries from the palette of CTB (4). For example, as noted above, video encoder 20 and video decoder 30 may generate a predictor palette (or update a previously generated predictor palette) after coding CTB (4). Video encoder 20 and video decoder 30 may include entries from CTB (4) in the generated or updated predictor palette. In this case, video encoder 20 and video decoder 30 may reinitialize the predictor palette based on entries of the predictor palette after coding CTB (4) and prior to coding CTB (5). In this example, video encoder 20 and video decoder 30 may be configured to reinitialize the predictor palette of CTB (8) after finishing the coding of CTB (4) and before coding CTB (5).

While the example above is described with respect to CTB (4) and CTB (5), video encoder 20 and video decoder 30 may be configured to apply generalized techniques in a similar manner. For example, with respect to the example of reinitializing the predictor palette for CTB (8), video encoder 20 and video decoder 30 may be configured to generate and/or update a predictor palette after coding N CTBs of the line of CTBs above CTB (8) (e.g., the above-neighboring line of CTBs, which includes CTB (4)). Video encoder 20 and video decoder 30 may be configured to reinitialize the predictor palette for CTB (8) based on the generated (or updated) predictor palette and before starting to code of the N+1$^{th}$ CTB in the CTB line above CTB (4). Accordingly, in some examples, the predictor palette used for re-initialization may include entries that are different than (or in addition to) the entries of the palette for CTB (4).

In one example, process described above for CTB (4) may be instead performed for CTB (5). For example, may be used instead of CTB (5) and CTB (6) may be used instead of CTB (5) in the above example. In this case, the CTB used for the palette re-initialization process may be the same CTB used for CABAC context initialization process applied for wavefronts, which would potentially harmonize palette re-initialization with the context initialization process.

In some examples, video encoder 20 and video decoder 30 may be configured not to reinitialize a predictor palette for an initial CTB that is located in the top line (assuming a top to bottom raster scan) of a picture or tile. For example, video encoder 20 and video decoder 30 may be configured not to reinitialize a predictor palette for CTB (0) (of tile 222A), because there is no CTB located above CTB (0).

While the examples of FIG. 5 are described with respect to CTBs for purposes of illustration, it should be understood that the techniques may be extended to any type of block of video data.

Figure 6:
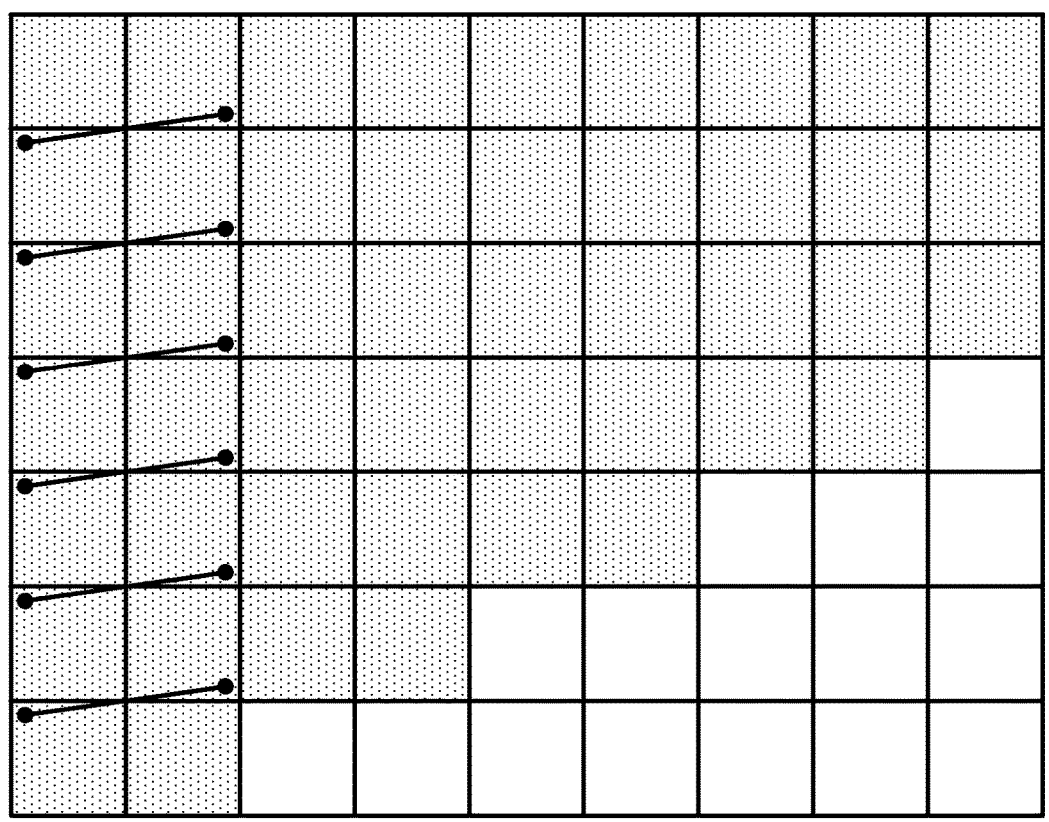
FIG. 6 is a conceptual diagram illustrating wavefronts for wavefront parallel processing (WPP).

FIG. 6 is a conceptual diagram illustrating wavefronts for wavefront parallel processing (WPP). HEVC defines a WPP technique. When WPP is enabled, each CTU row of a picture is a separated partition. Compared to slices and tiles, however, no coding dependences are broken at CTU row boundaries. Additionally, CABAC probabilities are propagated from the second CTU of the previous row, to further reduce the coding losses. Also, WPP does not change the regular raster scan order. Because dependences are not broken, the rate-distortion loss of a WPP bitstream is small, compared to a nonparallel bitstream.

When WPP is enabled, a number of processors up to the number of CTU rows can work in parallel to process the CTU row (or lines). The wavefront dependences, however, do not allow all the CTU rows to start decoding at the beginning of the picture. Consequently, the CTU rows also cannot finish decoding at the same time at the end of the picture. This introduces parallelization inefficiencies that become more evident when a high number of processors are used. FIG. 6 illustrates how WPP processes rows of CTBs in parallel, each row starting with the CABAC probabilities available after processing the second CTB of the row above.

According to aspects of this disclosure, as described in greater detail below, video encoder 20 and video decoder 30 may determine whether to reset a predictor palette based on the wavefronts illustrated in FIG. 6.

Figure 7:
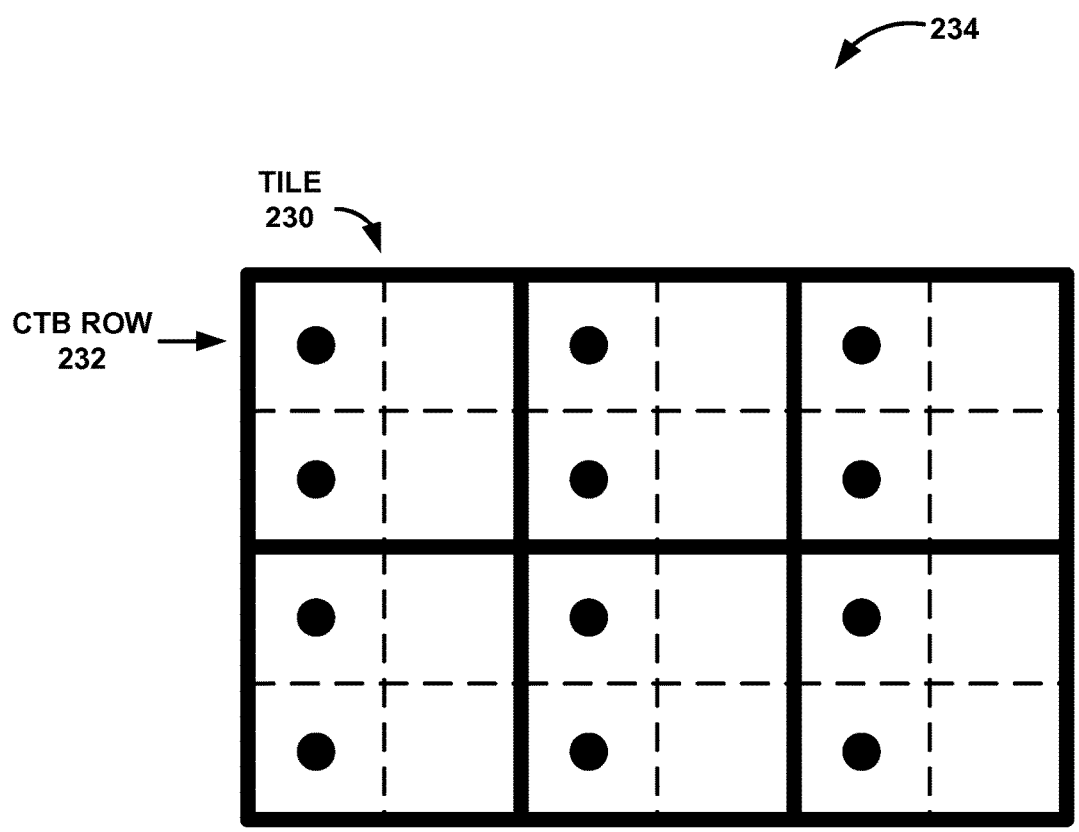
FIG. 7 is a conceptual diagram illustrating an example of predictor palette reset in the presence of multiple tiles and wavefronts, consistent with the techniques of this disclosure.

FIG. 7 is a conceptual diagram illustrating an example of predictor palette reset in the presence of multiple tiles and wavefronts, consistent with the techniques of this disclosure. In the example of FIG. 7, relatively thicker solid lines may indicate tile boundaries, such as tile boundaries of tile 230. Dashed lines indicate CTB boundaries. For example, CTB row 232 indicates a tile row of CTBs including the two upper-most CTBs of tile 230.

Some techniques of this disclosure include resetting a predictor palette based on a number of wavefronts and/or a number of tiles being used to code a picture, such as picture 234. For example, according to aspects of this disclosure, video encoder 20 and video decoder 30 may reset a predictor palette for first tile CTBs (such as the upper-leftmost CTB of tile 230) when multiple wavefronts and multiple tiles are used to code picture 234 (such as the tiles and wavefronts shown in FIGS. 5 and 6, respectively). In the example of FIG. 7, the solid circles included within the CTBs indicate a first tile CTB of the tiles for which palette resetting is performed. Video encoder 20 and video decoder 30 may reset a palette by setting the predictor palette size to zero and not predicting any palette entry of a palette being used to code a current block.

Figure 8:
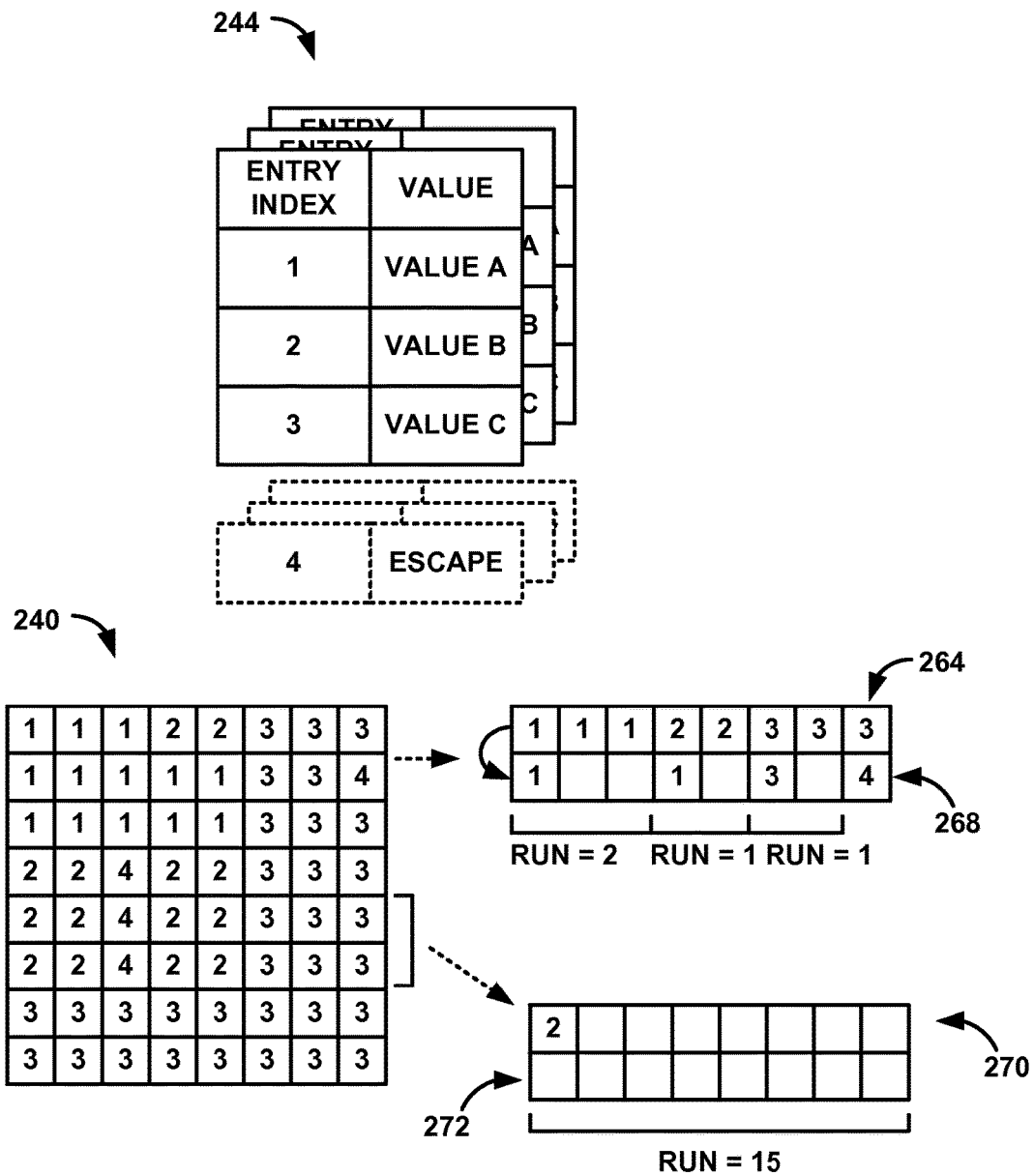
FIG. 8 is a conceptual diagram illustrating an example of determining indices to a palette for a block of pixels, consistent with techniques of this disclosure.

FIG. 8 is a conceptual diagram illustrating an example of determining indices to a palette for a block of pixels, consistent with techniques of this disclosure. For example, FIG. 5 includes a map 240 of indices that relate respective positions of pixels associated with the index values to an entry of palettes 244. For example, index 1 is associated with Value A, index 2 is associated with Value B, and index 3 is associated with Value C. In addition, when escape samples are indicated using implicit escape signaling, video encoder 20 and video decoder 30 may also add an additional index to palettes 244, illustrated in FIG. 5 as index 4, which may indicate that samples of map 240 associated with index 4 are escape samples. In this case, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244.

Video encoder 20 may, in such an example, also encode a palette index (shown in the example of FIG. 8 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value). Accordingly, video encoder 20 may encode one or more syntax elements indicating a number of consecutive index values in a given scan order that have the same index. As noted above, coding indices in this manner may be referred to as Value palette mode.

As noted above, runs may be used in conjunction with a CopyFromTop or Value mode. In an example for purposes of illustration, consider rows 264 and 268 of map 240. Assuming a horizontal, left to right scan direction, row 264 includes three index values of "1," two index values of "2," and three index values of "3." Row 268 includes five index values of "1," two index values of "3," and one sample that is not included in palettes 244 (represented by index 4, although a sample-level escape flag may be used for explicit escape signaling), which may be referred to as an escape sample.

In this example, video encoder 20 may use CopyFromTop mode to encode data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

After encoding the one or more syntax elements indicating the first position of row 264 and the run of two entries (noted above), video encoder 20 may encode the fourth and fifth positions in row 268 (from left to right), using Value mode. For example, video encoder 20 may encode one or more syntax elements indicating a value of 1 for the fourth position and one or more syntax elements indicating a run of 1 (e.g., Value mode). Hence, video encoder 20 encodes these two positions without reference to another line.

According to aspects of this disclosure, video encoder 20 and video decoder 30 may context code a run value for an index coded using Value mode based on the value of the index. For example, as described herein, video encoder 20 and video decoder 30 may use a context adaptive mode of a CABAC coding process to code data that indicates a run value. According to aspects of this disclosure, video encoder 20 and video decoder 30 may be configured to determine a context for coding a the data based on the index of the run.

In the example of FIG. 8, video encoder 20 and video decoder 30 code an index of 1 for the above-noted fourth position of map 40. Video encoder 20 and video decoder 30 may also binarize a run value of 1 for the fourth position of map 240. In one examples, video encoder 20 and video decoder 30 may generate a flag that indicates that the run value is greater than zero but not greater than one (which may be indicated using a separate flag).

According to aspects of this disclosure, video encoder 20 and video decoder 30 may select a context for coding the greater than zero flag based on the index value of 1. For example, according to some aspects, video encoder 20 and video decoder 30 may define a set of contexts for coding the run value. The set of contexts may include one context, two contexts, the contexts, four contexts, or more contexts.

In one example, video encoder 20 and video decoder 30 may be configured to select run context (0) based on the index being equal to zero. In this example, video encoder 20 and video decoder 30 may be configured to select run context (1) based on the index being any value other than zero. With this example, video encoder 20 and video decoder 30 select a run context of (1) based on the index being 1 for the fourth position of map 240.

In another example, video encoder 20 and video decoder 30 may be configured to select run context (0) based on the index being equal to zero. Video encoder 20 and video decoder 30 may be configured to select run context (1) based on the index being one. Video encoder 20 and video decoder 30 may be configured to select run context (2) based on the index being any value greater than one. With this example, video encoder 20 and video decoder 30 select a run context of (1) based on the index being 1 for the fourth position of map 240.

In another example, video encoder 20 and video decoder 30 may be configured to select run context (0) based on the index being equal to zero. Video encoder 20 and video decoder 30 may be configured to select run context (1) based on the index being one or two. Video encoder 20 and video decoder 30 may be configured to select run context (2) based on the index being greater than two. With this example, video encoder 20 and video decoder 30 select a run context of (1) based on the index being 1 for the fourth position of map 240.

According to aspects of this disclosure, the context may be based on an actual index value or an adjusted index value. For example, according to aspects of this disclosure, video encoder 20 and video decoder 30 may be configured to determine context for coding a run value based on a palette index signaled in a bitstream (which may be associated with the adjusted_palette_index syntax element), rather that the palette index actually used to code a sample in a block, in instances in which an adjusted palette index is signaled in the bitstream.

After coding the run associated with the fourth position of map 240, video encoder 20 may then encode the first position having an index value of 3 in row 268 using CopyFromTop mode relative to upper row 264. For example, video encoder 20 may signal a CopyFromTop mode and a run of 1. Accordingly, video encoder 20 may select between coding pixel or index values of a line relative to other values of the line, e.g., using a run, coding pixel or index values of a line relative to values of another line (or column), or a combination thereof. Video encoder 20 may, in some examples, perform a rate/distortion optimization to make the selection.

Video encoder 20 may then encode the escape sample for the final sample of row 268 (from left to right), which is not included in first palettes 244. For example, video encoder 20 may encode the final position of row 268 as an escape sample. That is, video encoder 20 may encode an indication that the final position of row 268 is an escape sample (e.g., index 4), as well as an indication of the sample value. Video decoder 30 may obtain the above-described syntax from an encoded bitstream and reconstruct row 268 using such syntax.

As noted above, there may be two or more techniques to code an indication of as sample coded as an escape sample. For example, with explicit escape signaling, video encoder 20 and video decoder 30 may code an explicit escape flag for each sample position of map 240. If a particular sample (such as the final sample of row 268) is coded as an escape sample, video encoder 20 and video decoder 30 may code data that indicates the color value for the particular sample. If the sample is not coded as an escape sample, video encoder 20 and video decoder 30 may code additional data to indicate whether the mode is CopyFromTop or Value, such as an SPoint flag.

With implicit escape signaling, video encoder 20 and video decoder 30 may add an additional index to palettes 244 (entry index 4). Video encoder 20 and video decoder 30 may use the additional index to palettes 244 to indicate that a sample is coded as an escape sample. The additional index, however, does not have an associated color value. Rather, video encoder 20 and video decoder 30 also code color values for each sample that is associated with the additional index. If the sample is not coded as an escape sample, video encoder 20 and video decoder 30 may code data to indicate whether the mode is CopyFromTop or Value, such as an SPoint flag.

According to aspects of this disclosure, video encoder 20 and video decoder 30 may be configured to code a run of indices using CopyFromTop mode that includes one or more samples coded as escape samples. In some instances, the samples coded as escape samples may be referred to as "indices" included in the run, despite the samples coded as escape samples not having an index that maps to a color value of a palette (e.g., the additional index is added to the palette for purposes of indicating samples coded as escape samples but does not have a corresponding color value). For example, video encoder 20 and video decoder 30 may be configured to copy escape flags (in explicit escape signaling) or an escape index (in implicit escape signaling) within a run of other indices that have associated color values in a palette being copied with CopyFromTop palette mode. The escape flags and the escape index may both be referred to as a syntax element that is not associated with a color value in the palette, because neither the flag nor the escape index are included in a palette.

Hence, according to aspects of this disclosure, video encoder 20 an video decoder 30 may be configured to infer that a current sample included in a run associated with the CopyFromTop palette mode (e.g., a sample being coded relative to a sample of another row) is coded as an escape sample if the above-neighboring sample to the current sample is coded as an escape sample. Video encoder 20 and video decoder 30 may also code the related escape values for all samples coded as escape sample following the run.

With respect to FIG. 8, the third sample of row 270 is coded as an escape sample and the third sample of row 272 is coded as an escape sample (assuming a left to right raster scan). In the example of FIG. 8, video encoder 20 and video decoder 30 may code a first sample of row 270 using CopyFromTop mode. In addition, video encoder 20 and video decoder 30 may code a run value indicating a run-length of 15 for the CopyFromTop mode. The run includes both the third sample of row 270 and the third sample of row 272. Accordingly, video encoder 20 and video decoder 30 may code data that indicates an escape value (e.g., a color value) for the third sample of row 270. Video encoder 20 and video decoder 30 may also code data that indicates an escape value (e.g., a color value) for the third sample of row 272, which may be different that the escape value of row 270.

Figure 9:
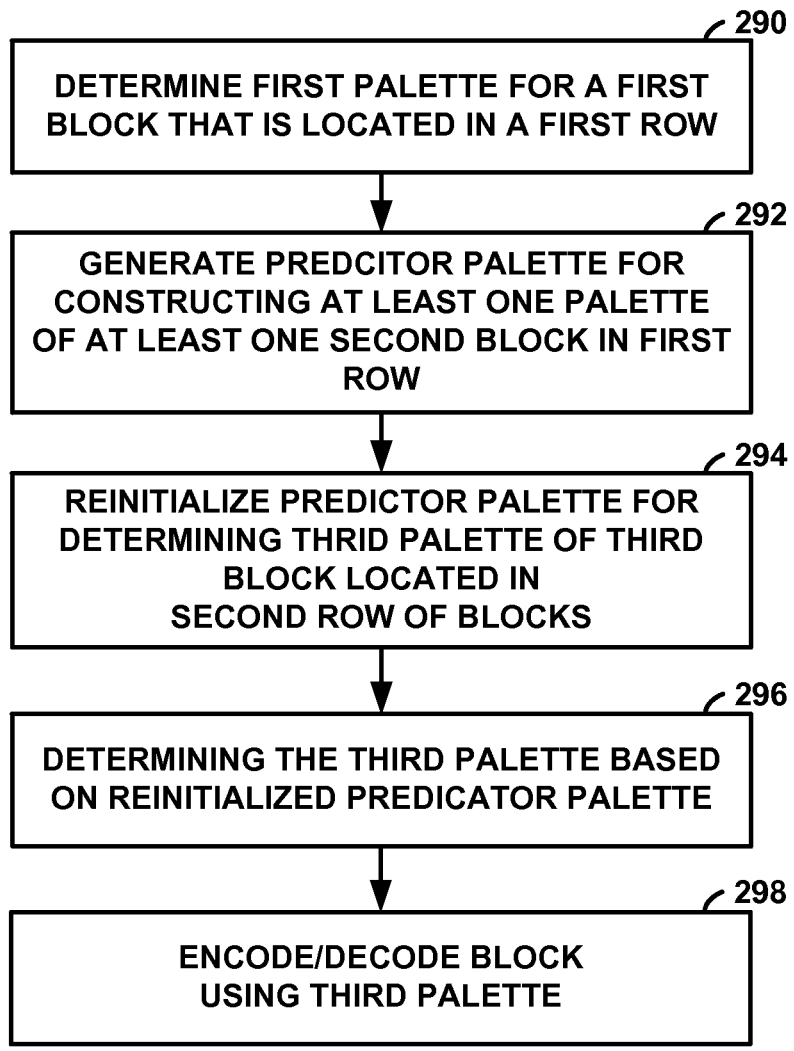
FIG. 9 is a flow diagram illustrating an example process for determining a predictor palette, consistent with techniques of this disclosure.

FIG. 9 is a flow diagram illustrating an example process for determining a predictor palette, consistent with techniques of this disclosure. The process of FIG. 9 is generally described as being performed by a video coder, which may include video encoder 20, video decoder 30, or a variety of other processors.

In the example of FIG. 9, the video coder may determine a first palette for a first block of video data that is located in a first row of blocks (290). While described with respect to "rows" for purposes of illustration, it should be understood that the techniques may also be applied to columns of blocks in instances in which the video coder scans blocks in column order. In any case, the first palette for the first block may include one or more palette entries each having a palette index that is associated with a color value for coding the block.

The video coder also generates a predictor palette of generating or constructing at least one palette of at least one second block that is located in the first row (292). For example, the video coder may generate a predictor palette based on entries of the first palette after coding the first block. The video coder may also update the predictor palette for each subsequently coded block of the first row that is coded using palette-based coding.

According to aspects of this disclosure, the video coder may reinitialize the predictor palette for determining a third palette of a third block that is located in a second row of blocks (294). The third block may be the first block that is coded in the second row of blocks. The third block may be positioned immediately below the first block.

The video coder may reinitialize the predictor palette based on entries of the palette of the first block. According to some examples, the video coder may be configured to reinitialize the predictor palette by replacing entries of the predictor palette with the entries from the first palette. In some examples, the video coder may be configured to reinitialize the predictor palette using the predictor palette that is generated after coding the first block (e.g., prior to coding a second block in the first row) or an updated predictor palette as updated after coding one or more other blocks of the first row.

The video coder may determine the third palette based on the reinitialized predictor palette (296). For example, the video coder may determine which entries of the predictor palette to copy to the third palette and copy the relevant entries. In some examples, as described herein, the video coder may determine the entries of the predictor palette to copy based on a prediction vector.

The video coder may then encode/decode the block using the third palette (298). For example, in instances in which the video coder operates as a video encoder (such as video encoder 20), the video encoder may encode data representing the indices of the third block using the determined palette in an encoded bitstream. In instances in which the video coder operates as a video decoder (such as video decoder 30), the video decoder may determine sample values for indices of the third block using the third palette.

Figure 10:
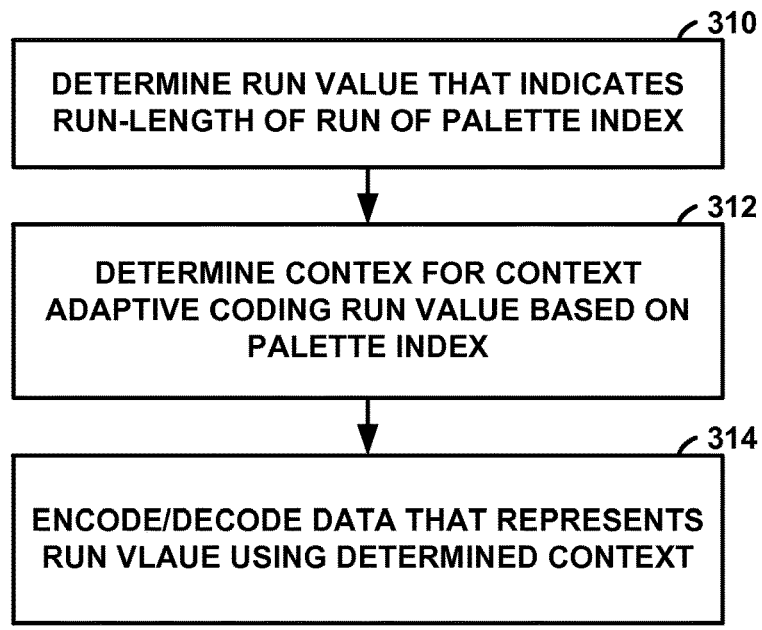
FIG. 10 is a flow diagram illustrating an example process for coding a run value of a run of palette indices, consistent with techniques of this disclosure.

FIG. 10 is a flow diagram illustrating an example process for coding a run value of a run of palette indices, consistent with techniques of this disclosure. The process of FIG. 10 is generally described as being performed by a video coder, which may include video encoder 20, video decoder 30, or a variety of other processors.

In the example of FIG. 10, the video coder determines a run value that indicates a run-length of a run of a palette index (310). For example, the video coder may code an indication of a palette index, e.g., using a Value palette mode. The video coder may also determine the number of consecutive samples in a scanning order that have the same value as the coded index. The number of consecutive samples may be the run value.

The video coder also determines context for context adaptive coding the determined data that indicates the run value based on the palette index (312). For example, the video coder may determine one or more contexts for CABAC coding the determined run value based on the palette index. In some examples, the video coder may select from a plurality of contexts defined for coding the run value.

The video coder may then encode/decode the data that indicates the run value using the determined context (314). For example, in instances in which the video coder operates as a video encoder (such as video encoder 20), the video encoder may encode the data that indicates the run value in an encoded bitstream. In instances in which the video coder operates as a video decoder (such as video decoder 30), the video decoder may parse (decode) the data that indicates the run value from an encoded bitstream.

Figure 11:
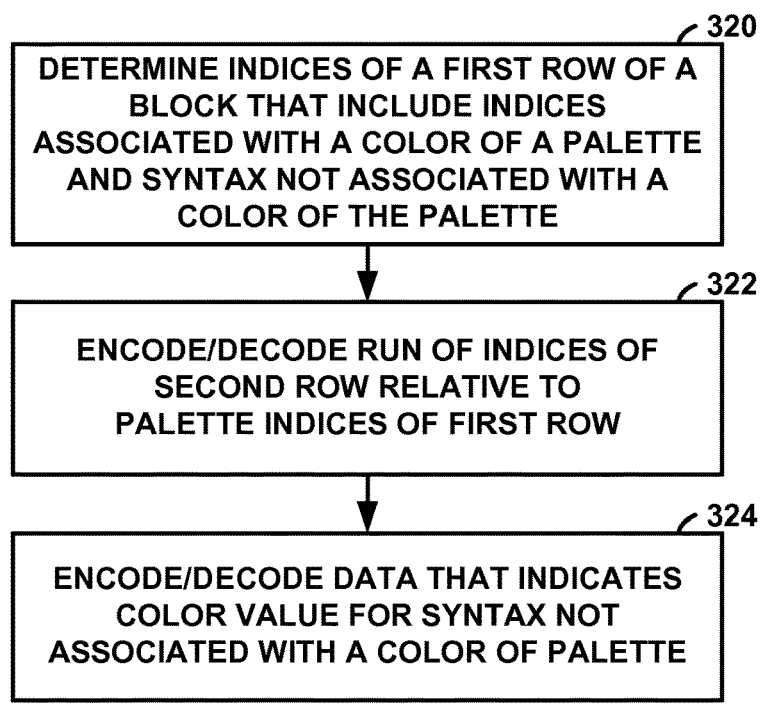
FIG. 11 is a flow diagram illustrating an example process for coding a run of indices coded with more than one palette coding mode, consistent with techniques of this disclosure.

FIG. 11 is a flow diagram illustrating an example process for coding a run of indices coded with more than one palette coding mode, consistent with techniques of this disclosure. The process of FIG. 11 is generally described as being performed by a video coder, which may include video encoder 20, video decoder 30, or a variety of other processors.

The video coder determines indices of a first row of a block that includes indices associated with a color of a palette and one or more syntax elements not associated with a color of the palette (320). For example, the video coder may determine samples for which palette indices are coded and samples coded in Escape palette mode.

The video coder may also encode/decode a run of indices of a second row relative to the palette indices of the first row (322). For example, in instances in which the video coder operates as a video encoder (such as video encoder 20), the video encoder may encode an indication of the CopyFromTop mode and an indication of the run length of the run. In instances in which the video coder operates as a video decoder (such as video decoder 30), the video decoder may decode an indication of the CopyFromTop mode and an indication of the run-length of the run. In either case, the run includes both the indices that have associated colors and the one or more syntax elements not associated with a color of the palette, e.g., samples coded in both CopyFromTop mode and as escape samples.

The video coder may then encode/decode data that indicates color values for syntax elements not associated with a color of the palette (324). For example, in instances in which the video coder operates as a video encoder (such as video encoder 20), the video encoder may encode data that indicates the color values of the samples represented by the syntax elements in an encoded bitstream. In instances in which the video coder operates as a video decoder (such as video decoder 30), the video decoder may decode data that indicates the color values of the samples represented by the syntax elements from a bitstream.

It should be understood that all of the techniques described herein may be used individually or in combination. This disclosure includes several signaling methods which may change depending on certain factors such as block size, palette size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

determining, by one or more processors of a video decoder, respective palette indices for samples of a first row of a block of video data, wherein the palette indices correspond to a palette for coding the block of video data, wherein the palette indices of the first row include one or more palette indices that are associated with at least one color value in the palette and an escape palette index, wherein samples having the escape palette index are not associated with a color value in the palette, and wherein the escape palette index has the numerically highest index of the palette;

decoding, by the one or more processors and from a video bitstream, a run of palette indices for samples of a second row of the block of video data relative to the palette indices for the samples of the first row, wherein the run includes the one or more palette indices that are associated with the at least one color value and the escape palette index;

determining, by the one or more processors, the palette indices for the samples of the second row of the block of video data indicated by the run relative to the palette indices for the samples of the first row of the block of video data;

decoding, from the video bitstream, data that indicates a color value for a sample, having the escape palette index and being in the first row, and data that indicates a color value for a sample, having the escape palette index and being in the second row, wherein the color value for the sample, having the escape Palette index and being in the first row, is different than the color value for the sample, having the escape palette index and being in the second row; and reconstructing, by the one or more processors, the block of video data based on the color value for the sample of the first row having the escape palette index, the color value for the sample of the second row having the escape palette index, the palette indices for the samples of the first row, and the palette indices for the samples of the second row.

2. The method of claim 1, wherein the first row is positioned above the second row in the block of video data, and wherein coding the run of palette indices of the second row relative to the palette indices of the first row comprises coding the run of palette indices of the second row using a CopyFromTop palette mode.

3. The method of claim 1, further comprising:
decoding, from the video bitstream, the palette including decoding the one or more indices that are associated with a color value in the palette; and
adding the escape palette index to the palette, such that the escape palette index has the numerically highest index of the palette.

4. The method of claim 1, further comprising determining a palette mode for a third index following the run of palette indices in the second row based on a palette mode of an above-neighboring index to the third index.

5. The method of claim 4, wherein determining the palette mode for the third index comprises determining a Value palette mode for the third index based on an above-neighboring sample being an escape sample.

6. The method of claim 5, wherein determining the Value palette mode for the third index comprises determining the Value palette mode without coding an indication of the Value palette mode from a bitstream.

7. A device for processing video data, the device comprising:
a memory configured to store a block of video data; and
one or more processors configured to:
determine respective palette indices for samples of a first row of a block of video data, wherein the palette indices correspond to a palette for coding the block of video data, wherein the palette indices of the first row include one or more palette indices that are associated with at least one color value in the palette and an escape palette index, wherein samples having the escape palette index are not associated with a color value in the palette, and wherein the escape palette index has the numerically highest index of the palette;
decode, from a video bitstream, a run of palette indices for samples of a second row of the block of video data relative to the palette indices for the samples of the first row, wherein the run includes the one or more palette indices that are associated with the at least one color value and the escape palette index;
determine the palette indices for the samples of the second row of the block of video data indicated by the run relative to the palette indices for the samples of the first row of the block of video data;
decode, from the video bitstream, data that indicates a color value for a sample, having the escape Palette index and being in the first row, and data that indicates a color value for a sample, having the escape palette index and being in the second row, wherein the color value for the sample, having the escape palette index and being in the first row, is different than the color value for the sample, having the escape palette index and being in the second row; and
reconstruct the block of video data based on the color value for the sample of the first raw having the escape palette index, the color value for the sample of the second row having the escape palette index, the palette indices for the samples of the first row, and the palette indices for the samples of the second row.

8. The device of claim 7, wherein the first row is positioned above the second row in the block of video data, and wherein to code the run of palette indices of the second row relative to the palette indices of the first row, the one or more processors are configured to code the run of palette indices of the second row using a CopyFromTop palette mode.

9. The device of claim 7, wherein the one or more processors are further configured to:
decode, from the video bitstream, the palette including decoding the one or more indices that are associated with a color value in the palette; and
add the escape palette index to the palette, such that the escape palette index has the numerically highest index of the palette.

10. The device of claim 7, wherein the one or more processors are further configured to determine a palette mode for a third index following the run of palette indices in the second row based on a palette mode of an above-neighboring index to the third index.

11. The device of claim 10, wherein to determine the palette mode for the third index, the one or more processors are configured to determine a Value palette mode for the third index based on an above-neighboring sample being an escape sample.

12. The device of claim 11, wherein to determine the Value palette mode for the third index, the one or more processors are configured to determine the Value palette mode without coding an indication of the Value palette mode from a bitstream.

13. The device of claim 7, further comprising a display configured to display the decoded block.

14. The device of claim 7, wherein the device comprises at least one of:
an integrated circuit;
a microprocessor; or
a wireless communication device.

15. A method of processing video data, the method comprising:
determining, by one or more processors of a video encoder, respective palette indices for samples of a first row of a block of video data, wherein the palette indices correspond to a palette for coding the block of video data, wherein the palette indices of the first row include one or more palette indices that are associated with at least one color value in the palette and an escape palette index, wherein samples having the escape palette index are not associated with a color value in the palette, and wherein the escape palette index has the numerically highest index of the palette;
encoding, by the one or more processors and in a video bitstream, a run of palette indices for samples of a second row of the block of video data relative to the palette indices for the samples of the first row, wherein the run includes the one or more palette indices that are associated with the at least one color value and the escape palette index;
determining, by the one or more processors, the palette indices for the samples of the second row of the block of video data indicated by the run relative to the palette indices for the samples of the first row of the block of video data;
encoding, by the one or more processors and in the video bitstream, data that indicates a color value for a sample, having the escape palette index and being in the first row, and data that indicates a color value for a sample, having the escape palette index and being in the second row, wherein the color value for the sample, having the escape palette index and being in the first row, is different than the color value for the sample, having the escape palette index and being in the second row; and reconstructing, by the one or more processors, the block of video data based on the color value for the sample of the first row having the escape palette index, the color value for the sample of the second row having the escape palette index, the palette indices for the samples of the first row, and the palette indices for the samples of the second row.

16. The method of claim 15, further comprising:
encoding, in the video bitstream, the palette including encoding the one or more indices that are associated with a color value in the palette; and
adding the escape palette index to the palette, such that the escape palette index has the numerically highest index of the palette.

17. A device for processing video data, the device comprising:
a memory configured to store a block of video data; and
one or more processors configured to:
   determine respective palette indices for samples of a first row of a block of video data, wherein the palette indices correspond to a palette for coding the block of video data, wherein the palette indices of the first row include one or more palette indices that are associated with at least one color value in the palette and an escape palette index, wherein samples having the escape palette index are not associated with a color value in the palette, and wherein the escape palette index has the numerically highest index of the palette;
   encode, in a video bitstream, a run of palette indices for samples of a second row of the block of video data relative to the palette indices for the samples of the first row, wherein the run includes the one or more palette indices that are associated with the at least one color value and the escape palette index;
   determine the palette indices for the samples of the second row of the block of video data indicated by the run relative to the palette indices for the samples of the first row of the block of video data;
   encode, in the video bitstream, data that indicates a color value for a sample, having the escape palette index and being in the first row, and data that indicates a color value for a sample, having the escape palette index and being in the second row, wherein the color value for the sample, having the escape palette index and being in the first row, is different than the color value for the sample, having the escape Palette index and being in the second row; and
   reconstruct the block of video data based on the palette indices of the first row and the palette indices of the second row.

18. The device of claim 17, wherein the one or more processors are further configured to:
encode, in the video bitstream, the palette including encoding the one or more indices that are associated with a color value in the palette; and
adding the escape palette index to the palette, such that the escape palette index has the numerically highest index of the palette.

19. The device of claim 17, further comprising a camera configured to capture a picture that includes the block of video data.

20. The device of claim 17, wherein the device comprises at least one of:
an integrated circuit;
a microprocessor; or
a wireless communication device.

* * * * *